（12）United States Patent
Wiens-Kind et al.

(10) Patent No.: US 10,481,574 B2
(45) Date of Patent: *Nov. 19, 2019

(54) BUILDING ALARM MANAGEMENT SYSTEM WITH MOBILE DEVICE NOTIFICATIONS

(71) Applicant: Johnson Controls Technology Company, Plymouth, MI (US)

(72) Inventors: Garrett Wiens-Kind, Milwaukee, WI (US); Adam R. Grabowski, Brookfield, WI (US); Mohammad Arif Mansoor, Madison, WI (US); Michael Robert Seidel, Milwaukee, WI (US); Prashant P. Taralkar, Milwaukee, WI (US); Ann M. Cook, Hartland, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/586,228

(22) Filed: May 3, 2017

(65) Prior Publication Data
US 2017/0321923 A1 Nov. 9, 2017

Related U.S. Application Data

(60) Provisional application No. 62/331,880, filed on May 4, 2016.

(51) Int. Cl.
G05B 19/048 (2006.01)
G08B 27/00 (2006.01)
(Continued)

(52) U.S. Cl.
CPC ......... *G05B 19/048* (2013.01); *G05B 19/042* (2013.01); *G08B 27/005* (2013.01);
(Continued)

(58) Field of Classification Search
None
See application file for complete search history.

(56) References Cited

U.S. PATENT DOCUMENTS 6,745,027 B2 6/2004 Twitchell, Jr.
6,879,913 B1 4/2005 Yu
(Continued)

FOREIGN PATENT DOCUMENTS

CA 2777693 1/2013
CN 102214000 10/2011
(Continued)

OTHER PUBLICATIONS

"Samsung to Acquire CSR for its Indoor GPS technology", Indoor LBS online blog, Jul. 16, 2012, retrieved from the internet at: http://indoorlbs.blogspot.com/2012/07/samsung-to-acquire-csr-for-indoor-gps.html on Aug. 7, 2014, 1 page as printed.
(Continued)

*Primary Examiner* — Adnan Aziz
(74) *Attorney, Agent, or Firm* — Foley & Lardner LLP

(57) ABSTRACT

A building alarm management system for a building includes a processing circuit configured to receive one or more alarms from building equipment of the building and receive location information for the building equipment located in the building and one or more mobile devices associated with one or more users located in the building. The processing circuit is further configured to retrieve role information including roles associated with the one or more users and send the one or more alarms to the one or more mobile devices based on the roles associated with the one or more users and the locations of the one or more mobile devices and the building equipment.

20 Claims, 25 Drawing Sheets

(51) Int. Cl.
  *F24F 11/00*  (2018.01)
  *G05B 19/042*  (2006.01)
  *F24F 120/12*  (2018.01)
  *F24F 11/32*  (2018.01)
  *F24F 11/56*  (2018.01)

(52) U.S. Cl.
  CPC ............ G08B 27/006 (2013.01); *F24F 11/32* (2018.01); *F24F 11/56* (2018.01); *F24F 2120/12* (2018.01); *G05B 2219/2614* (2013.01)

(56) References Cited

U.S. PATENT DOCUMENTS

| | | |
|---|---|---|
| 6,934,540 B2 | 8/2005 | Twitchell, Jr. |
| 7,133,704 B2 | 11/2006 | Twitchell, Jr. |
| 7,155,264 B2 | 12/2006 | Twitchell, Jr. |
| 7,200,132 B2 | 4/2007 | Twitchell, Jr. |
| 7,209,468 B2 | 4/2007 | Twitchell, Jr. |
| 7,209,771 B2 | 4/2007 | Twitchell, Jr. |
| 7,221,668 B2 | 5/2007 | Twitchell, Jr. |
| 7,378,957 B2 | 5/2008 | Twitchell, Jr. |
| 7,378,958 B2 | 5/2008 | Twitchell, Jr. |
| 7,378,959 B2 | 5/2008 | Twitchell, Jr. |
| 7,391,321 B2 | 6/2008 | Twitchell, Jr. |
| 7,394,361 B1 | 7/2008 | Twitchell, Jr. |
| 7,430,437 B2 | 9/2008 | Twitchell, Jr. |
| 7,438,334 B2 | 10/2008 | Terry et al. |
| 7,522,568 B2 | 4/2009 | Twitchell, Jr. |
| 7,526,381 B2 | 4/2009 | Twitchell, Jr. |
| 7,529,547 B2 | 5/2009 | Twitchell, Jr. |
| 7,535,339 B2 | 5/2009 | Twitchell, Jr. |
| 7,538,656 B2 | 5/2009 | Twitchell, Jr. |
| 7,538,657 B2 | 5/2009 | Twitchell, Jr. |
| 7,538,658 B2 | 5/2009 | Twitchell, Jr. |
| 7,539,520 B2 | 5/2009 | Twitchell, Jr. |
| 7,542,849 B2 | 6/2009 | Twitchell, Jr. |
| 7,554,442 B2 | 6/2009 | Twitchell, Jr. |
| 7,563,991 B2 | 7/2009 | Twitchell et al. |
| 7,570,208 B2 | 8/2009 | Wang et al. |
| 7,574,168 B2 | 8/2009 | Twitchell et al. |
| 7,574,300 B2 | 8/2009 | Twitchell et al. |
| 7,583,769 B2 | 9/2009 | Twitchell et al. |
| 7,650,135 B2 | 1/2010 | Twitchell |
| 7,705,747 B2 | 4/2010 | Twitchell, Jr. |
| 7,733,818 B2 | 6/2010 | Twitchell, Jr. |
| 7,733,944 B2 | 6/2010 | Twitchell et al. |
| 7,742,744 B2 | 6/2010 | Twitchell, Jr. |
| 7,742,745 B2 | 6/2010 | Twitchell, Jr. |
| 7,742,772 B2 | 6/2010 | Twitchell, Jr. |
| 7,742,773 B2 | 6/2010 | Twitchell, Jr. |
| 7,746,838 B2 | 6/2010 | Twitchell, Jr. |
| 7,783,246 B2 | 8/2010 | Twitchell et al. |
| 7,822,551 B2 | 10/2010 | Twitchell, Jr. |
| 7,828,342 B2 | 11/2010 | Terry et al. |
| 7,828,343 B2 | 11/2010 | Terry et al. |
| 7,828,344 B2 | 11/2010 | Terry et al. |
| 7,828,345 B2 | 11/2010 | Terry et al. |
| 7,828,346 B2 | 11/2010 | Terry et al. |
| 7,830,273 B2 | 11/2010 | Twitchell, Jr. |
| 7,830,850 B2 | 11/2010 | Twitchell, Jr. |
| 7,830,852 B2 | 11/2010 | Twitchell, Jr. |
| 7,847,676 B2 | 12/2010 | Twitchell, Jr. |
| 7,883,126 B2 | 2/2011 | Terry et al. |
| 7,883,127 B2 | 2/2011 | Terry et al. |
| 7,883,128 B2 | 2/2011 | Terry et al. |
| 7,900,980 B2 | 3/2011 | Terry et al. |
| 7,904,071 B2 | 3/2011 | Twitchell, Jr. |
| 7,907,941 B2 | 3/2011 | Twitchell, Jr. |
| 7,912,644 B2 | 3/2011 | Twitchell, Jr. |
| 7,938,459 B2 | 5/2011 | Terry et al. |
| 7,940,716 B2 | 5/2011 | Twitchell, Jr. |
| 7,940,717 B2 | 5/2011 | Twitchell, Jr. |
| 7,940,719 B2 | 5/2011 | Twitchell, Jr. |
| 7,940,736 B2 | 5/2011 | Twitchell, Jr. |
| 7,941,095 B2 | 5/2011 | Twitchell, Jr. |
| 8,045,929 B2 | 10/2011 | Twitchell, Jr. |
| 8,050,625 B2 | 11/2011 | Twitchell, Jr. |
| 8,050,668 B2 | 11/2011 | Twitchell, Jr. |
| 8,068,807 B2 | 11/2011 | Twitchell, Jr. |
| 8,078,139 B2 | 12/2011 | Twitchell, Jr. |
| 8,095,070 B2 | 1/2012 | Twitchell, Jr. |
| 8,111,651 B2 | 2/2012 | Twitchell, Jr. |
| 8,144,671 B2 | 3/2012 | Twitchell, Jr. |
| 8,172,154 B1 | 5/2012 | Figley et al. |
| 8,204,439 B2 | 6/2012 | Twitchell, Jr. |
| 8,207,848 B2 | 6/2012 | Berger et al. |
| 8,218,514 B2 | 7/2012 | Twitchell, Jr. |
| 8,223,680 B2 | 7/2012 | Twitchell, Jr. |
| 8,238,826 B2 | 8/2012 | Twitchell, Jr. |
| 8,275,404 B2 | 9/2012 | Berger et al. |
| 8,279,067 B2 | 10/2012 | Berger et al. |
| 8,280,345 B2 | 10/2012 | Twitchell, Jr. |
| 8,284,045 B2 | 10/2012 | Twitchell, Jr. |
| 8,284,741 B2 | 10/2012 | Twitchell, Jr. |
| 8,300,551 B2 | 10/2012 | Koop et al. |
| 8,301,082 B2 | 10/2012 | Twitchell, Jr. |
| 8,315,237 B2 | 11/2012 | Berger et al. |
| 8,315,563 B2 | 11/2012 | Twitchell, Jr. |
| 8,315,565 B2 | 11/2012 | Twitchell, Jr. |
| 8,326,226 B2 | 12/2012 | Twitchell, Jr. |
| 8,331,862 B2 | 12/2012 | Twitchell, Jr. |
| 8,391,435 B2 | 3/2013 | Farley et al. |
| 8,427,508 B2 | 4/2013 | Mattila et al. |
| 8,433,309 B2 | 4/2013 | Twitchell, Jr. |
| 8,462,662 B2 | 6/2013 | Robins |
| 8,605,660 B2 | 12/2013 | Twitchell, Jr. |
| 8,705,523 B2 | 4/2014 | Koop et al. |
| 8,726,478 B2 | 5/2014 | Twitchell et al. |
| 8,755,787 B2 | 6/2014 | Twitchell, Jr. |
| 9,541,625 B2 * | 1/2017 | McSheffrey ........ H04W 64/006 |
| 2004/0256473 A1 | 12/2004 | Hull et al. |
| 2005/0197775 A1 * | 9/2005 | Smith .................... G08B 21/10 |
| | | 702/3 |
| 2005/0215280 A1 | 9/2005 | Twitchell, Jr. |
| 2006/0208888 A1 * | 9/2006 | Patel .................... G07C 9/00111 |
| | | 340/572.1 |
| 2006/0226970 A1 * | 10/2006 | Saga ...................... G08B 7/066 |
| | | 340/506 |
| 2008/0111692 A1 | 5/2008 | Twitchell |
| 2008/0129458 A1 | 6/2008 | Twitchell |
| 2008/0143484 A1 | 6/2008 | Twitchell |
| 2008/0144554 A1 | 6/2008 | Twitchell |
| 2008/0212544 A1 | 9/2008 | Twitchell |
| 2008/0294291 A1 | 11/2008 | Salsbury |
| 2008/0303897 A1 | 12/2008 | Twitchell, Jr. |
| 2008/0304443 A1 | 12/2008 | Twitchell, Jr. |
| 2009/0016308 A1 | 1/2009 | Twitchell, Jr. |
| 2009/0026773 A1 | 1/2009 | Terry et al. |
| 2009/0065596 A1 | 3/2009 | Seem et al. |
| 2009/0129306 A1 | 5/2009 | Twitchell et al. |
| 2009/0267770 A1 | 10/2009 | Twitchell, Jr. |
| 2009/0283320 A1 | 11/2009 | Twitchell et al. |
| 2010/0007470 A1 | 1/2010 | Twitchell, Jr. |
| 2010/0070085 A1 | 3/2010 | Harrod et al. |
| 2010/0106318 A1 * | 4/2010 | Grohman ............ H04L 12/2818 |
| | | 700/276 |
| 2010/0114383 A1 * | 5/2010 | Rosca ................... H04L 67/12 |
| | | 700/276 |
| 2010/0121862 A1 | 5/2010 | Twitchell, Jr. |
| 2010/0130267 A1 | 5/2010 | Twitchell, Jr. |
| 2010/0141401 A1 | 6/2010 | Twitchell, Jr. |
| 2010/0145865 A1 | 6/2010 | Berger et al. |
| 2010/0190479 A1 * | 7/2010 | Scott .................... G06F 17/289 |
| | | 455/414.1 |
| 2010/0214059 A1 | 8/2010 | Twitchell, Jr. |
| 2010/0214060 A1 | 8/2010 | Twitchell, Jr. |
| 2010/0214061 A1 | 8/2010 | Twitchell et al. |
| 2010/0214074 A1 | 8/2010 | Twitchell, Jr. |
| 2010/0214077 A1 | 8/2010 | Terry et al. |
| 2010/0219938 A1 | 9/2010 | Twitchell, Jr. |
| 2010/0219939 A1 | 9/2010 | Twitchell, Jr. |
| 2010/0231381 A1 | 9/2010 | Twitchell, Jr. |
| 2010/0250460 A1 | 9/2010 | Twitchell, Jr. |
| 2010/0260087 A1 | 10/2010 | Twitchell, Jr. |

(56) References Cited

U.S. PATENT DOCUMENTS

| | | |
|---|---|---|
| 2010/0330930 A1 | 12/2010 | Twitchell |
| 2011/0006882 A1 | 1/2011 | Twitchell, Jr. |
| 2011/0047015 A1 | 2/2011 | Twitchell, Jr. |
| 2011/0071685 A1* | 3/2011 | Huneycutt ............. G05B 15/02 700/275 |
| 2011/0115816 A1* | 5/2011 | Brackney ............... G06Q 10/06 345/629 |
| 2012/0310416 A1 | 12/2012 | Tepper et al. |
| 2013/0015968 A1* | 1/2013 | Hogg ................... G08B 25/003 340/521 |
| 2013/0054033 A1* | 2/2013 | Casilli ................... H04L 12/282 700/276 |
| 2013/0169681 A1 | 7/2013 | Rasane et al. |
| 2013/0191019 A1* | 7/2013 | Pakzad ................ G01C 21/206 701/454 |
| 2014/0279210 A1 | 9/2014 | Cooney et al. |
| 2014/0320282 A1* | 10/2014 | Zhang .................... G08B 7/066 340/502 |
| 2014/0365390 A1* | 12/2014 | Braun .................. G06Q 50/265 705/325 |
| 2015/0312696 A1 | 10/2015 | Ribbich et al. |
| 2015/0327010 A1 | 11/2015 | Gottschalk et al. |
| 2016/0014558 A1 | 1/2016 | Berlin et al. |
| 2016/0047663 A1* | 2/2016 | Iyer .................... G01C 21/3415 701/411 |
| 2016/0223998 A1* | 8/2016 | Songkakul ............. G05B 15/02 |
| 2017/0024839 A1* | 1/2017 | Klein ...................... H04W 4/90 |
| 2017/0213303 A1* | 7/2017 | Papadopoulos ....... G06F 16/248 |

FOREIGN PATENT DOCUMENTS

| | | |
|---|---|---|
| EP | 2 228 270 | 9/2010 |
| EP | 2 372 263 | 10/2011 |
| EP | 2 607 802 | 6/2013 |
| KR | 100538082 | 12/2005 |
| KR | 20110128096 | 11/2011 |
| KR | 20130053535 | 5/2013 |
| WO | WO-2010/141076 | 12/2010 |
| WO | WO-2013/049297 | 4/2013 |
| WO | WO-2013/089713 | 6/2013 |

OTHER PUBLICATIONS

Anthony, "Think GPS is cool? IPS will blow your mind", ExtremeTech, Apr. 24, 2012, retrieved from the internet at http://www.extremetech.com/extreme/126843-think-gps-is-cool-ips-will-blow-your-mind/2 on Aug. 7, 2014, 4 pages as printed.

Boogar, "Why Polestar's indoor GPS Technology 10 years in the making is the future of local commerce", Rude Baguett—online blog, Apr. 15, 2013, retrieved from the internet at http://www.rudebaguette.com/2013/04/15/why-polestars-indoor-gps-technology-10-years-in-the-making-is-the-future-of-local-commerce/ on Aug. 7, 2014, 3 pages as printed.

Broadcom Integrated Multi-Constellation GNSS Receiver BCM4752 Product Information Page, retrieved from the internet at http://www.broadcom.com/products/GPS/GPS-Silicon-Solutions/BCM4752 on Aug. 7, 2014, 1 page.

Murfin, "Indoor Location Breaking Through", GPS World—online, Apr. 17, 2013, retrieved from the internet at: http://gpsworld.com/indoor-location-breaking-through/ on Aug. 7, 2014, 3 pages as printed.

U.S. Department of Energy National Renewable Energy Laboratory, "Augmented Reality Building Operations Tool", retrieved from the internet at http://techportal.eere.energy.gov/technology.do/techID=540# on Aug. 7, 2014, 2 pages.

Ward-Bailey, "Indoor GPS: Why tech companies want to track you inside", The Christian Science Monitor—online, Mar. 28, 2013, retrieved from the internet at http://www.csmonitor.com/Innovation/Horizons/2013/0328/Indoor-GPS-Why-tech-companies-want-to-track-you-inside on Aug. 7, 2014, 2 pages.

Skeledžija, et al., "Smart Home Automation System for Energy Efficient Housing," *IEEE, MIPRO*, May 26-30, 2014, pp. 166-177.

\* cited by examiner

New Alarm Category — Save

- Alarm Name
- Filter By Space & Equipment — All Spaces & Equipment 🔍
- Alarm Type — Select ▶
- Alarm Status — Select ▶
- Time Frame — Last 24 Hours ▶
- Priority — To

< Authorization — Save

- Robert.Jolly@site.com
- Greg.Benard@site.com
- Read Only
- Admin Only

Alarms (45)  2302  Filter

1 | 20 | 24

- VAV-2-10 — High Alarm — ZN-T 80.1°F ☆5m — 2304, 2306
- VAV-1-01 — High Alarm — ZN-T 79.2°F ☆5m — 2308
- Chilled Water Plant — High Alarm — 507 Chilled Water System — SCHWS-T 55.0°F ☆10m — 2310
- VMA-30 — Low Warning — Zone NetSensor - 199 — SCHWS-T 55.0°F ☆10m — 2312
- Dry Skid 2 — High Alarm — RA-DEWPT -15.0°F 2h — 2314
- VAV-102 — High Alarm — Zone Temperature Out of Limits — ZN-T 88.5°F 2d — 2316
- VMA-57 — High Alarm — DA-T 88.5°F ☆10m

∨  Filter  ∧

| Alarm Type | ∧ |
| Alarm Status | ∧ |
| Priority | ∧ |
| Time Frame | Last 24 Hours  ∧ |
| Space & Equipment | ∧ |

2400

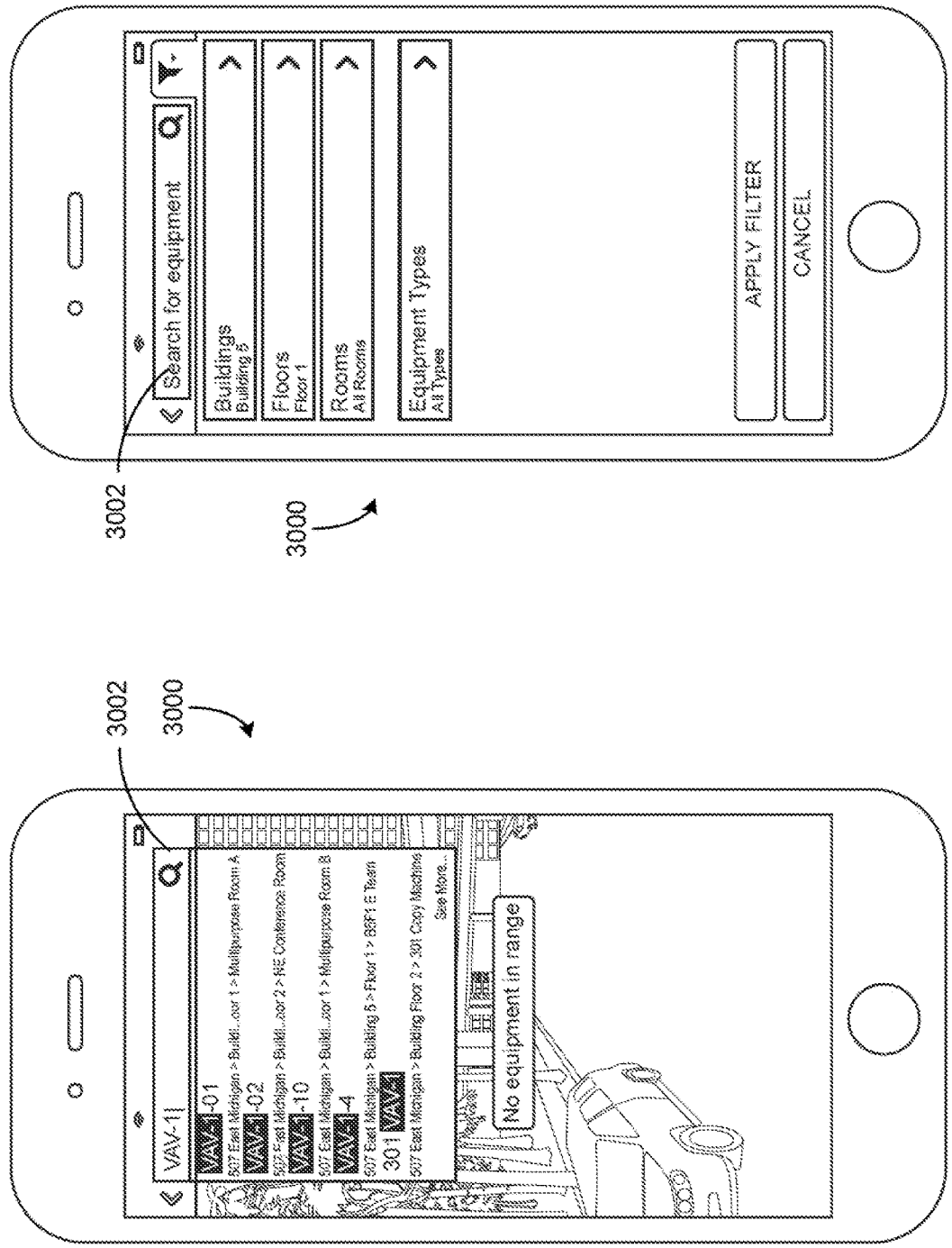

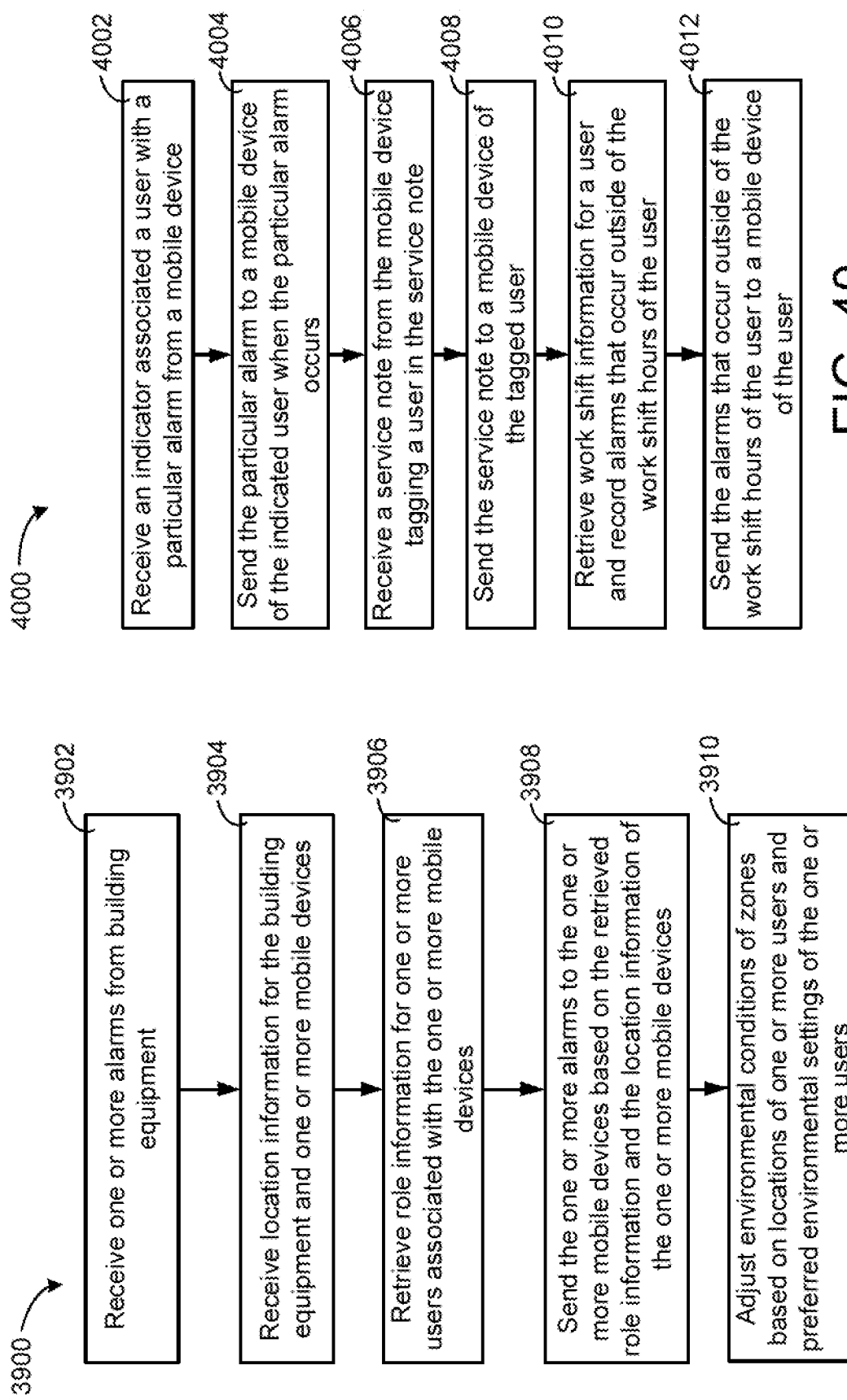

BUILDING ALARM MANAGEMENT SYSTEM WITH MOBILE DEVICE NOTIFICATIONS

CROSS-REFERENCE TO RELATED PATENT APPLICATIONS

This application claims the benefit of and priority to U.S. Provisional Patent Application No. 62/331,880, filed May 4, 2016, the entire disclosure of which is incorporated by reference herein.

BACKGROUND

A building management system can be a system that includes multiple controllers, servers, and databases that can operate to control one or more systems of a building. The building management system can control building equipment such as security systems, lighting systems, heating ventilation and air conditioning (HVAC) systems, and other systems in the building. In some embodiments, the building management system communicates with the building equipment via internet protocols or building protocols such as Modus or BACnet. In a building with a building management system, the building management system may receive data from the one or more systems of the building that it uses to trigger alarms. The alarms may indicate that equipment of the building is not properly functioning. Further, the alarms may indicate that there is a situation in the building that needs to be addressed. For example, a temperature of a server room may be too hot, a piece of building equipment is not turning on, and other events that may occur in the building that can be detected.

SUMMARY

One implementation of the present disclosure is a building alarm management system for a building that includes a processing circuit configured to receive one or more alarms from building equipment of the building, receive location information for the building equipment located in the building and one or more mobile devices associated with one or more users located in the building, and retrieve role information including roles associated with the one or more users. The processing circuit is further configured to send the one or more alarms to the one or more mobile devices based on the roles associated with the one or more users and the locations of the one or more mobile devices and the building equipment.

In some embodiments, the processing circuit of the alarm management system is configured to automatically adjust environmental conditions of a zone of the building based on preferred environmental setpoints of one of the one or more users in response to determining, based on the location information, that the one of the one or more users is in the zone of the building. In some embodiments, the processing circuit is configured to automatically adjust the environmental conditions of the zone of the building based on preferred environmental setpoints of a user with a highest permission ranking of all users in the zone in response to determining, based on the location information, that more than one of the one or more users are located in the zone of the building.

In some embodiments, the roles include a security guard role, a maintenance worker role, and a special skills role. The processing circuit of the building alarm management system can be configured to send a set of the one or more alarms that are associated with the security guard role to mobile devices associated with users that are associated with the security guard role, send a set of the one or more alarms that are associated with the maintenance worker role to mobile devices associated with users that are associated with the maintenance worker role, and send a set of the one or more alarms that are associated with the special skills role to mobile devices associated with users that are associated with the special skills role.

In some embodiments, the processing circuit of the building alarm management system is configured to receive an indicator from one or more of the users via one or more of the mobile devices that associates the one of the one or more users with a particular alarm of the alarms and send an alarm notification to a mobile device associated with the associated user in response to determining that the particular alarm has occurred.

In some embodiments, the processing circuit of the building alarm management system is configured to receive a service note from one of the one or more mobile devices, wherein the service note includes a user tag of one of the one or more users and send the service note to a mobile device associated with the tagged user.

In some embodiments, the processing circuit of the building alarm management system is configured to retrieve work shift information for the one or more users, wherein the work shift information indicates the days and times that the one or more users work in the building, record one or more alarms for one of the one or more users, wherein the recorded one or more alarms are alarms that occur outside of the work shift of the one user, and send the recorded one or more alarms associated with the one of the one or more users to a mobile device associated with the one of the one or more users.

In some embodiments, the processing circuit of the building alarm management system is configured to store the location information over time, wherein the stored location information indicates a plurality of locations that one of the one or more mobile devices has been located in the building over time, determine a trajectory for the one of the one or more mobile devices based on the stored location information, predict an area of the building that the one of the one or more mobile devices will be located based on the determined trajectory, and send information associated with the predicted area of the building to the one of the one or more mobile devices before the one of the one or more mobile device enters the predicted area.

In some embodiments, the processing circuit the building alarm management system is configured to receive wireless signal strengths from a plurality of wireless modules configured to emit and receive wireless signals, wherein the signal strengths are signal strengths of wireless connections between the plurality of wireless modules and the building equipment and the one or more mobile devices and determine the locations of the building equipment and the one or more mobile devices within the building based on the signal strengths.

In some embodiments, the building equipment and the one or more mobile devices includes GPS devices and altimeters. In some embodiments, the location information received by the processing circuit of the building alarm management system received from the building equipment and the one or more mobile devices and is determined by the building equipment and the one or more mobile devices based on the GPS devices and the altimeters.

In some embodiments, the location information received by the processing circuit of the building alarm management system is sent to the building alarm management system by an access control system. In some embodiments, the access control system is configured to determine the locations for the building equipment and the one or more mobile devices based on at least one of access data from one or more card readers of the building that the one or more users can interact with via an access card associated with the one or more users and video data from one or more cameras located in the building that are configured to record the video data, wherein the video data includes images of the one or more users.

Another implementation of the present disclosure is a method for a building alarm management system for a building. The method includes receiving one or more alarms from building equipment of the building, receiving location information for building equipment and one or more mobile devices associated with one or more users located in the building, retrieving role information including roles associated with the one or more users, and sending the one or more alarms to the one or more mobile devices based on the roles associated with the one or more users and the locations of the one or more mobile devices and the building equipment. The method further includes automatically adjusting environmental conditions of a zone of the building by causing the building equipment to be controlled based on preferred environmental setpoints of one of the one or more users in response to determining, based on the location information, that the one of the one or more users is in the zone of the building.

In some embodiments, the roles include a security guard role, a maintenance worker role, and a special skills role. In some embodiments, the method further includes sending a set of the one or more alarms that are associated with the security guard role to mobile devices associated with users that are associated with the security guard role, sending a set of the one or more alarms that are associated with the maintenance worker role to mobile devices associated with users that are associated with the maintenance worker role, and sending a set of the one or more alarms that are associated with the special skills role to mobile devices associated with users that are associated with the special skills role.

In some embodiments, the method further includes receiving an indicator from one or more of the users via one or more of the mobile device that associates the one of the one or more users with a particular alarm of the alarms and sending an alarm notification to a mobile device associated with the one of the one or more users in response to determining that the particular alarm has occurred.

In some embodiments, the method further includes receiving a service note from the one of the one or more mobile devices. In some embodiments, the service note includes a user tag that indicates another of the one or more users. In some embodiments, the method further includes sending the service note to a mobile device associated with the tagged user.

In some embodiments, the method further includes retrieving work shift information for the one or more users. In some embodiments, the work shift information indicates the days and times that the one or more users work in the building, recording one or more alarms. In some embodiments, the recorded one or more alarms are alarms that occur outside of the work shift of the one of the one or more users, and sending the recorded one or more alarms to a mobile device associated with the one of the one or more users.

In some embodiments, the method further includes storing the location information over time. In some embodiments, the stored location information indicates a plurality of locations that one of the one or more mobile devices has been located in the building over time. In some embodiments, the method further includes determining a trajectory for one of the one or more mobile devices based on the stored location information, predicting an area of the building that the one of the one or more mobile devices will be located based on the determined trajectory, and sending information associated with the predicted area of the building to the one of the one or more mobile devices before the one of the one or more mobile device enters the predicted area.

Another implementation of the present disclosure is a building alarm management system for a building. The building alarm management system includes a processing circuit configured to receive one or more alarms from building equipment of the building, receive location information for the building equipment and one or more mobile devices associated with one or more users located in the building, and retrieve role information including roles associated with the one or more users, the roles include a security guard role, a maintenance worker role, and a special skills role. The processing circuit is further configured to send a set of the one or more alarms that are associated with the security guard role to mobile devices associated with users that are associated with the security guard role, send a set of the one or more alarms that are associated with the maintenance worker role to mobile devices associated with users that are associated with the maintenance worker role, and send a set of the one or more alarms that are associated with the special skills role to mobile devices associated with users that are associated with the special skills role.

In some embodiments, the processing circuit of the building alarm management system is configured to receive an indicator from one or more of the users via one or more of the mobile device that associates the one of the one or more users with a particular alarm of the alarms, send an alarm notification to a mobile device associated with the tagged user in response to determining that the particular alarm has occurred, and receive a service note from one of the one or more mobile devices. In some embodiments, the service note includes a user tag of one of the one or more users. In some embodiments, the processing circuit of the building alarm management system is configured to send the service note to a mobile device associated with the tagged user.

In some embodiments, the processing circuit of the building alarm management system is configured to retrieve work shift information for the one or more users. In some embodiments, the work shift information indicates the days and times that the one or more users work in the building, record one or more alarms for one of the one or more users. In some embodiments, the recorded one or more alarms are alarms that occur outside of the work shift of the one user, and send the recorded one or more alarms associated with the one of the one or more users to the a mobile device to display the recorded one or more alarms.

In some embodiments, the processing circuit of the building alarm management system is configured to store the location information over time, the stored location information indicates a plurality of locations that one of the one or more mobile devices has been located in the building over time, determine a trajectory for the one of the one or more mobile devices based on the stored location information, predict an area of the building that the one of the one or more mobile devices will be located based on the determined trajectory, and send information associated with the predicted area of the building to the one of the one or more mobile devices before the one of the one or more mobile device enters the predicted area.

BRIEF DESCRIPTION OF THE DRAWINGS

FIG. 19 is an image of a site information interface which can be generated by the alarm notifier application, according to an exemplary embodiment.

FIG. 20 is an image of an alarm viewer interface which can be generated by the alarm notifier application, according to an exemplary embodiment.

FIG. 21 is an image of an alarm categories interface which can be generated by the alarm notifier application, according to an exemplary embodiment.

FIG. 22 is an image of an authorization interface which can be generated by the alarm notifier application 518, according to an exemplary embodiment.

FIG. 23 is an image of an alarm information interface which can be generated by the alarm notifier application, according to an exemplary embodiment.

FIG. 24 is an image of an alarm filter interface which can be generated by the alarm notifier application, according to an exemplary embodiment.

FIGS. 30-31 are images of an equipment searching interface which may be presented via the mobile device, according to an exemplary embodiment.

FIG. 39 is a flow diagram of a process for sending alarms to a mobile device of a user based on the location of the user and a role of the user, according to an exemplary embodiment.

FIG. 40 is a flow diagram of a process for sending a user service notes and alarms based on a user tag, according to an exemplary embodiment.

DETAILED DESCRIPTION

Overview

Figure 1:
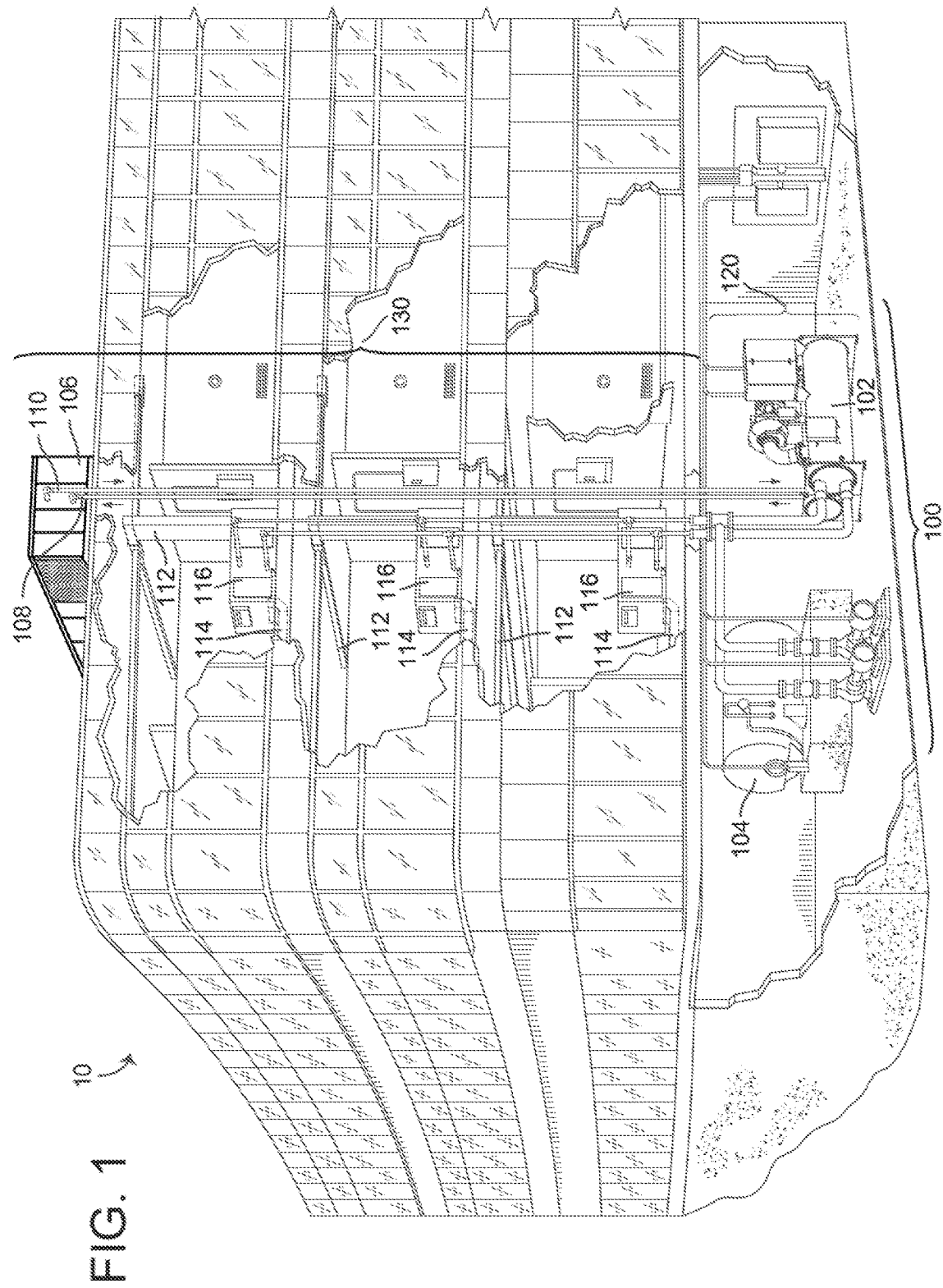
FIG. 1 is a drawing of a building equipped with a HVAC system, according to an exemplary embodiment.

Referring generally to the FIGURES, a building alarm management system with mobile device notifications and components thereof are shown, according to various exemplary embodiments. The building alarm management system can receive alarms from various building systems (e.g., a fire detection and alarm system, an access control system, a building automation system, etc.) and send alarm notifications to mobile devices. The mobile devices can run an alarm notifier application that allows a user to interact with the building alarm management system. In some embodiments, the alarm notifier application links the alarms back to a user interface for the building automation system.

The alarm notifier application can receive alarm notifications from the alarm management system (e.g., push notifications via data messaging) and can provide the user with various options for viewing alarms, responding to alarms, and customizing the alarm notifications. The alarm notifier application allows a user to view alarms for specific buildings and filter the alarms by various categories or attributes (e.g., time, alarm type, equipment type, severity, etc.). In some embodiments, the alarm notifier application allows push notifications to be enabled/disabled for various alarm categories to provide flexibility in the types of notifications provided to the user. Additional features and advantages of the building alarm management system and alarm notifier application are described in greater detail below.

In some buildings, a paper shift log may be maintained by building employees to document their work and provide insights to other technicians (e.g., employees working a later shift). The shift log can be digitized by the building alarm management system. This may integrate an offline process into an online workflow and improve productivity. The building alarm management system may allow an employee to enter in service notes. These service notes may allow other building employees to view what has happened in the building during the shift of the employee entering the service log. Further, in some cases, the employee can tag another employee in the service note. This may cause the building alarm management system to send a push message with the service message to the tagged employee or may determine what service notes are displayed to an employee when they log into an application such as the alarm notification application.

Upon logging into the alarm notifier application or another application associated with the building alarm management system, an employee may be presented with alarms that have occurred since last logging in or since their last work shift. This may reduce the amount of information presented to the user. If all the alarms were to be presented to the user in a chronological order, the user would have to work backwards through the alarms to determine what is currently happening to the time that the user left the building at the end of their last shift. In some embodiments, the alarms may be presented to the user in the order since their last shift so that they can see all the alarms that have occurred in the building since they were last at the building. Since all alarms are kept digitally, no paper log files need to be recorded by building employees.

Building Automation System and HVAC System

Referring now to FIGS. 1-4, an exemplary building automation system (BAS) and HVAC system in which the systems and methods of the present invention can be implemented are shown, according to an exemplary embodiment. Referring particularly to FIG. 1, a perspective view of a building 10 is shown. Building 10 is served by a BAS. A BAS is, in general, a system of devices configured to control, monitor, and manage equipment in or around a building or building area. A BAS can include, for example, a HVAC system, a security system, a lighting system, a fire alarming system, any other system that is capable of managing building functions or devices, or any combination thereof.

The BAS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
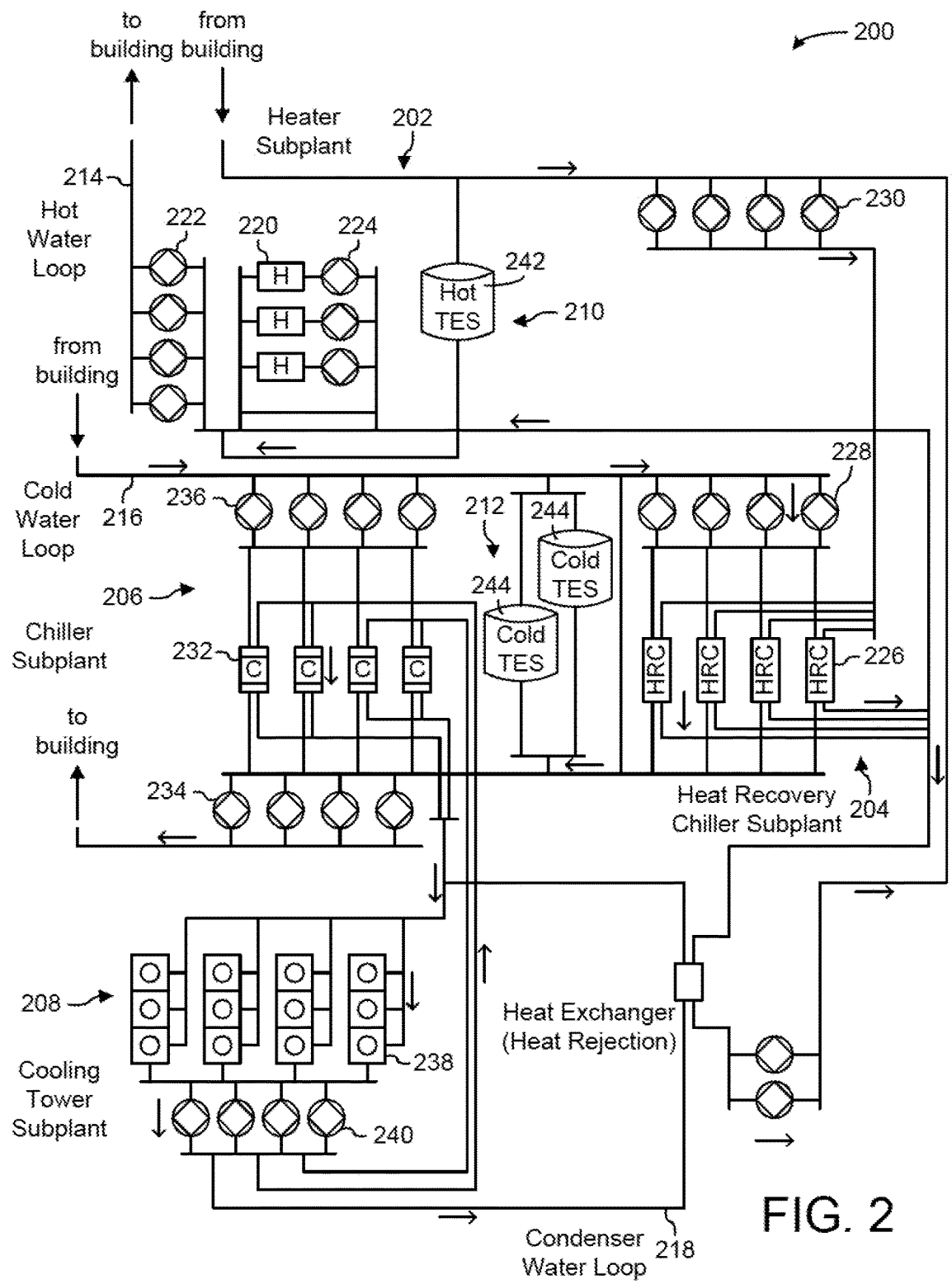
FIG. 2 is a block diagram of a waterside system that may be used in conjunction with the building of FIG. 1, according to an exemplary embodiment.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
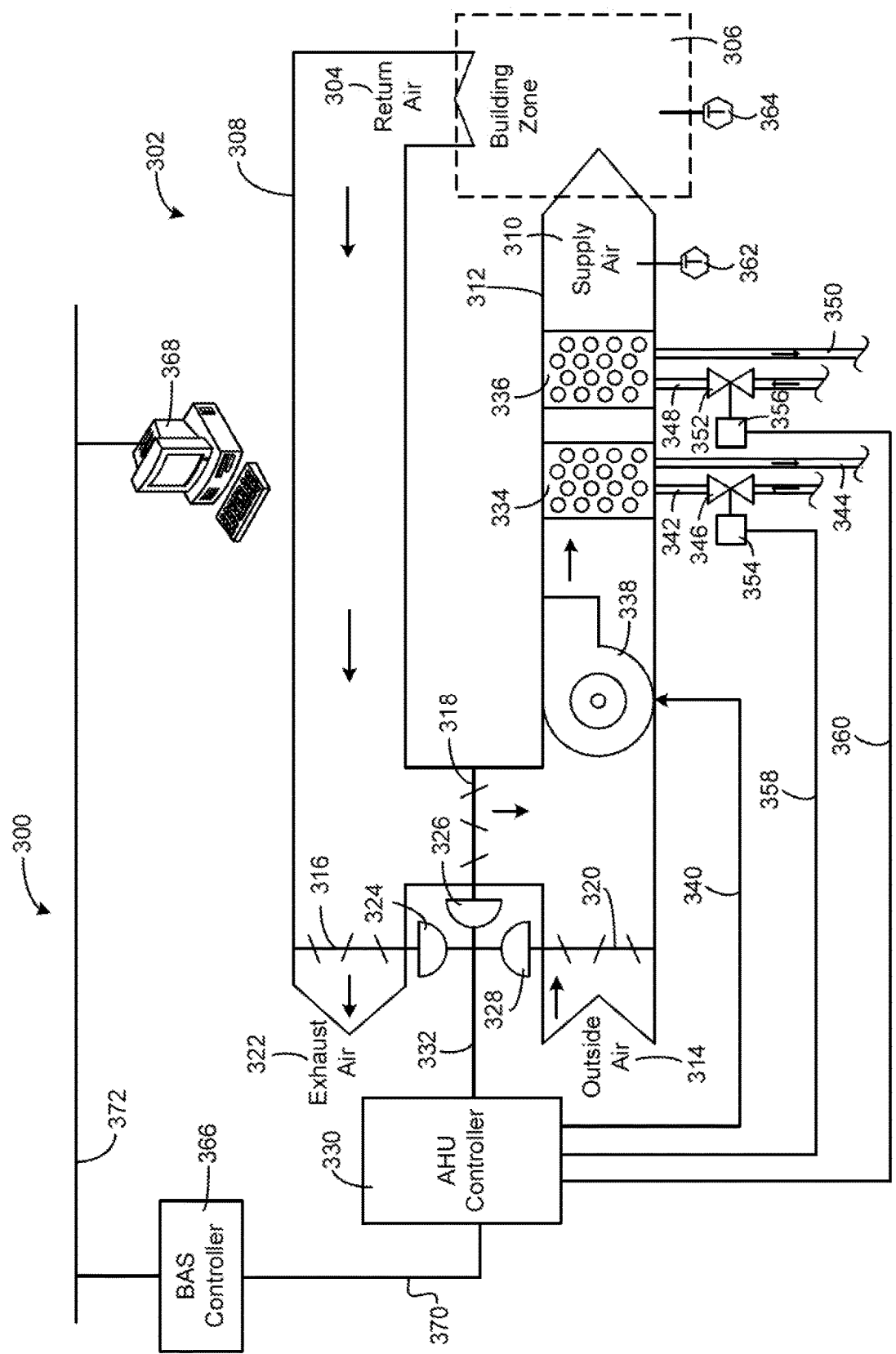
FIG. 3 is a block diagram of an airside system that may be used in conjunction with the building of FIG. 1, according to an exemplary embodiment.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BAS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BAS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building automation system (BAS) controller 366 and a client device 368. BAS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BAS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BAS controller 366 can be separate (as shown in FIG. 3) or integrated. In an integrated implementation, AHU controller 330 can be a software module configured for execution by a processor of BAS controller 366.

In some embodiments, AHU controller 330 receives information from BAS controller 366 (e.g., commands, setpoints, operating boundaries, etc.) and provides information to BAS controller 366 (e.g., temperature measurements, valve or actuator positions, operating statuses, diagnostics, etc.). For example, AHU controller 330 can provide BAS controller 366 with temperature measurements from temperature sensors 362-364, equipment on/off states, equipment operating capacities, and/or any other information that can be used by BAS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BAS controller 366 and/or AHU controller 330 via communications link 372.

Figure 4:
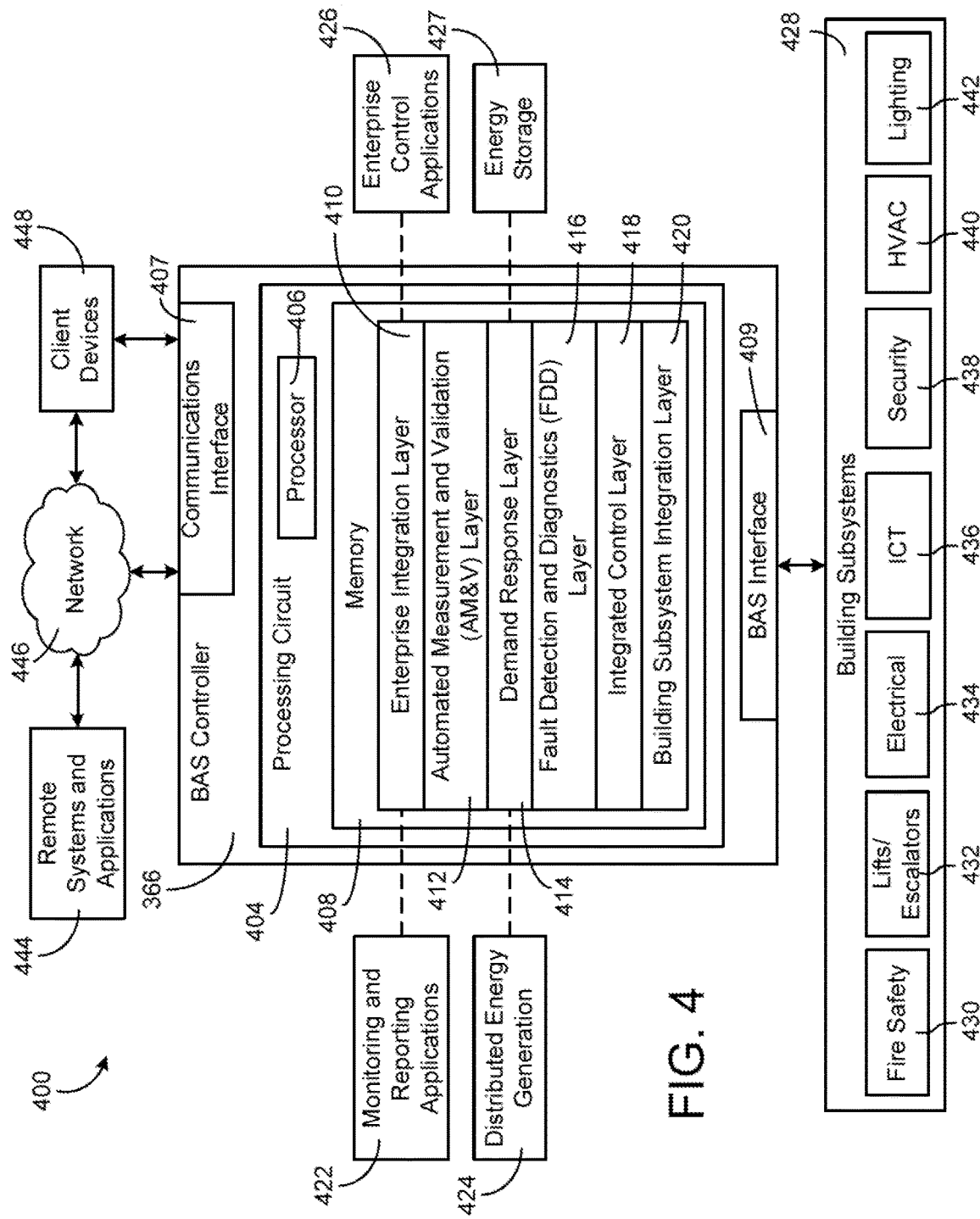
FIG. 4 is a block diagram of a building automation system (BAS) that may be used to monitor and/or control the building of FIG. 1, according to an exemplary embodiment.

Referring now to FIG. 4, a block diagram of a building automation system (BAS) 400 is shown, according to an exemplary embodiment. BAS 400 can be implemented in building 10 to automatically monitor and control various building functions. BAS 400 is shown to include BAS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BAS controller 366 is shown to include a communications interface 407 and a BAS interface 409. Interface 407 can facilitate communications between BAS controller 366 and external applications (e.g., monitoring and reporting applications 422, enterprise control applications 426, remote systems and applications 444, applications residing on client devices 448, etc.) for allowing user control, monitoring, and adjustment to BAS controller 366 and/or subsystems 428. Interface 407 can also facilitate communications between BAS controller 366 and client devices 448. BAS interface 409 can facilitate communications between BAS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BAS interface 409 is an Ethernet interface. In other embodiments, both communications interface 407 and BAS interface 409 are Ethernet interfaces or are the same Ethernet interface.

Still referring to FIG. 4, BAS controller 366 is shown to include a processing circuit 404 including a processor 406 and memory 408. Processing circuit 404 can be communicably connected to BAS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BAS controller 366 is implemented within a single computer (e.g., one server, one housing, etc.). In various other embodiments BAS controller 366 can be distributed across multiple servers or computers (e.g., that can exist in distributed locations). Further, while FIG. 4 shows applications 422 and 426 as existing outside of BAS controller 366, in some embodiments, applications 422 and 426 can be hosted within BAS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BAS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BAS controller 366. In yet other embodiments, enterprise control applications 426 can work with layers 410-420 to optimize building performance (e.g., efficiency, energy use, comfort, or safety) based on inputs received at interface 407 and/or BAS interface 409.

Building subsystem integration layer 420 can be configured to manage communications between BAS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BAS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration can reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BAS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alarm message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BAS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alarm a user to repair the fault before it becomes more severe.

Building Alarm Management System with Mobile Device Notifications

Figure 5:
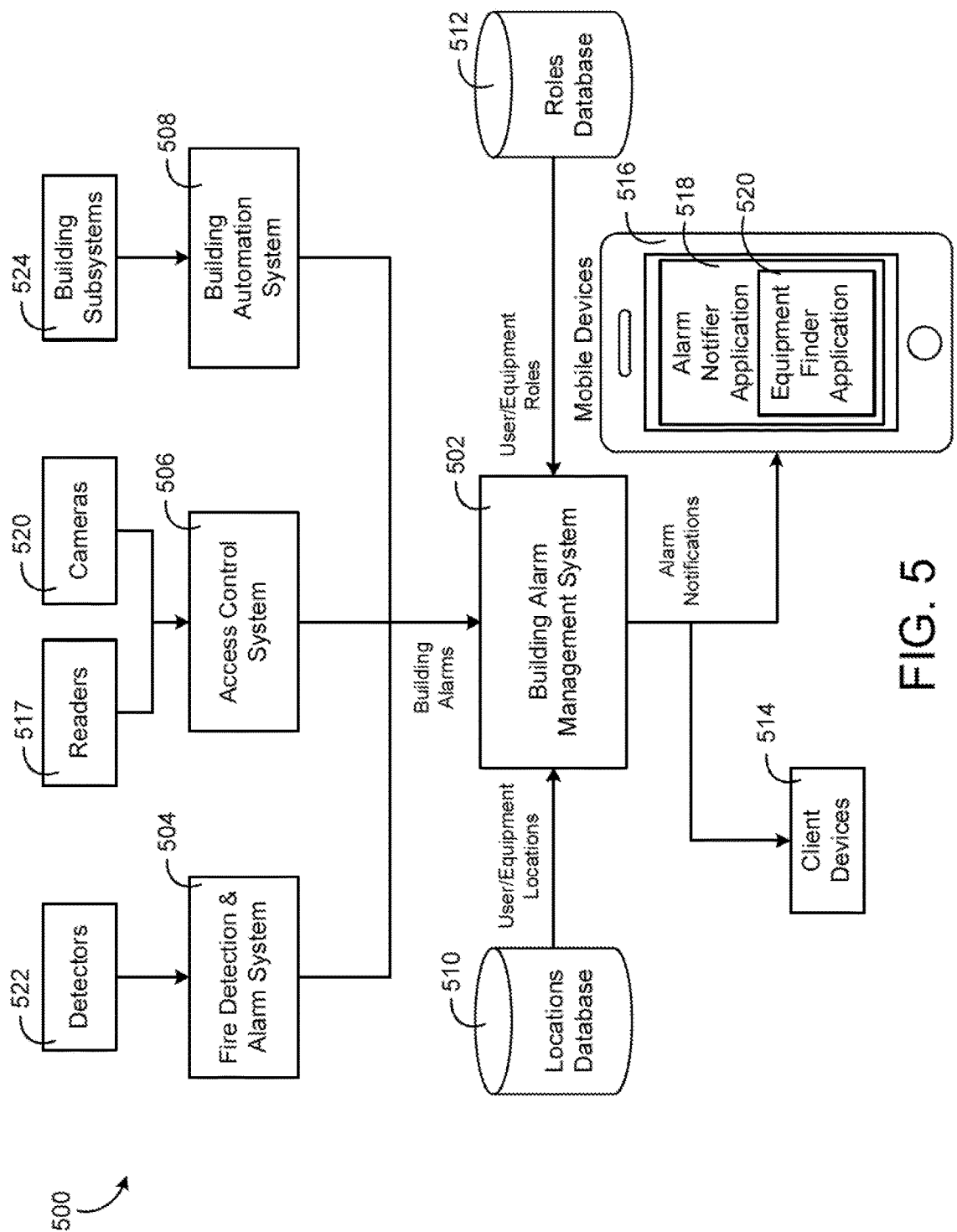
FIG. 5 is a block diagram of a building alarm management system with location-based and role-based alarm distribution, according to an exemplary embodiment.

Referring now to FIG. 5, a block diagram of a system 500 including a building alarm management system 502 is shown, according to an exemplary embodiment. The building alarm management system 502 can receive alarms from various building systems. For example, the building alarm management system 502 is shown receiving alarms from a fire detection and alarm system 504, an access control system 506, and a building automation system 508. Alarms received by the building alarm management system 502 can include, for example, building equipment alarms, fault detection alarms, security alarms, fire alarms, intruder alarms, or other types of alarms or notifications.

The alarms can be received in a variety of formats. In some embodiments, the alarms are received in a format specific to the system or device providing the alarm. For example, alarms from the fire detection and alarm system 504 can be received in a format specific to the fire detection and alarm system 504. The alarms can be alarms received by fire detection and alarm system 504 from detectors 522 (e.g., smoke detectors, air quality detectors, etc.). Similarly, alarms from the access control system 506 and building automation system 508 can be received in formats specific to the access control system 506 and building automation system 508. Alarms can be automatically generated by various systems or devices, from building subsystems 524, manually provided by users, or otherwise submitted to the building alarm management system 502.

The building alarm management system 502 can access a locations database 510 to identify user and equipment locations. The locations database 510 can be populated with location information that specifies the location of each user and device in the building. In some embodiments, the building alarm management system 502 automatically identifies user and equipment locations using information received from the access control system 506 (e.g., badge scans from readers 517, camera images/video from cameras 520, etc.), mobile devices (e.g., nearby Wi-Fi access points), building equipment, or other devices capable of measuring and/or reporting location information. Various techniques for automatically determining user locations and equipment locations are described in detail with reference to FIGS. 6-13.

The building alarm management system 502 can access a roles database 512 to identify user and equipment roles. The roles database 512 can be populated with role information that specifies the responsibilities, permissions, functions, or other attributes of various users and equipment in the system. For example, the roles database 512 can identify a user's job description (e.g., security guard, maintenance worker, technical support, etc.), group membership (e.g., member of research team, member of security personnel, etc.), special skills (e.g., trained in first aid or CPR, fluent in Russian, etc.), or other attributes that describe the function or capabilities of the user. The roles database 512 can also identify the functions or capabilities of building equipment. For example, the roles database 512 can indicate that a particular air handling unit is capable of providing airflow to a room or zone of the building.

The building alarm management system 502 processes the alarms and sends alarm notifications to various user devices (e.g., client devices 514, mobile devices 516, etc.). In some embodiments, the alarm notifications are sent to specific users based on the users' locations and/or roles. For example, a security alarm received from the access control system 506 may indicate that an unauthorized entry occurred a particular location. The building alarm management system 502 can send a customized notification to security personnel (e.g., users identified as having the "security personnel" role) with specific instructions for handling the security alarm. The alarm notification provided to each user can be based on the locations of the users relative to the location of the alarm (e.g., the location at which the unauthorized entry occurred). For example, security personnel located close to the alarm location can receive a first set of instructions, whereas security personnel located further from the alarm location can receive a second set of instructions.

In some embodiments, the mobile devices run an alarm notifier application 518. The alarm notifier application 518 can receive alarm notifications from the alarm management system (e.g., push notifications via data messaging) and can provide users with various options for viewing alarms, responding to alarms, and customizing the alarm notifications. The alarm notifier application 518 allows a user to view alarms for specific buildings and filter the alarms by various categories or attributes (e.g., time, alarm type, equipment type, severity, etc.). In some embodiments, the alarm notifier application 518 allows push notifications to be enabled/disabled for various alarm categories to provide flexibility in the types of notifications provided to the user. The alarm notifier application 518 may include an equipment finder application 520. The equipment finder application 520 may allow a user to view the locations of various pieces of equipment for a building based on equipment data received from the building alarm management system 502. In some embodiments, the equipment finder application 520 may be a separate application from the alarm notifier application 518 or may be integrated with the alarm notifier application 518. Additional features and advantages of the building alarm management system 502 and the alarm notifier application 518 are described in greater detail below. FIGS. 17-27 illustrate various interfaces of the alarm notifier application 518 and the functionality of the alarm notifier application 518 while FIGS. 28-36 illustrate interfaces and the functionality of the equipment finder application 520.

Determining User and Equipment Locations

Referring now to FIGS. 6-13, several systems and methods 600-1300 which can be used by the building alarm management system 502 to automatically determine user and equipment locations are shown, according to an exemplary embodiment. Systems and methods 600-1300 can be used to automatically populate the locations database 510 with the locations of various users and/or building equipment.

Figure 6:
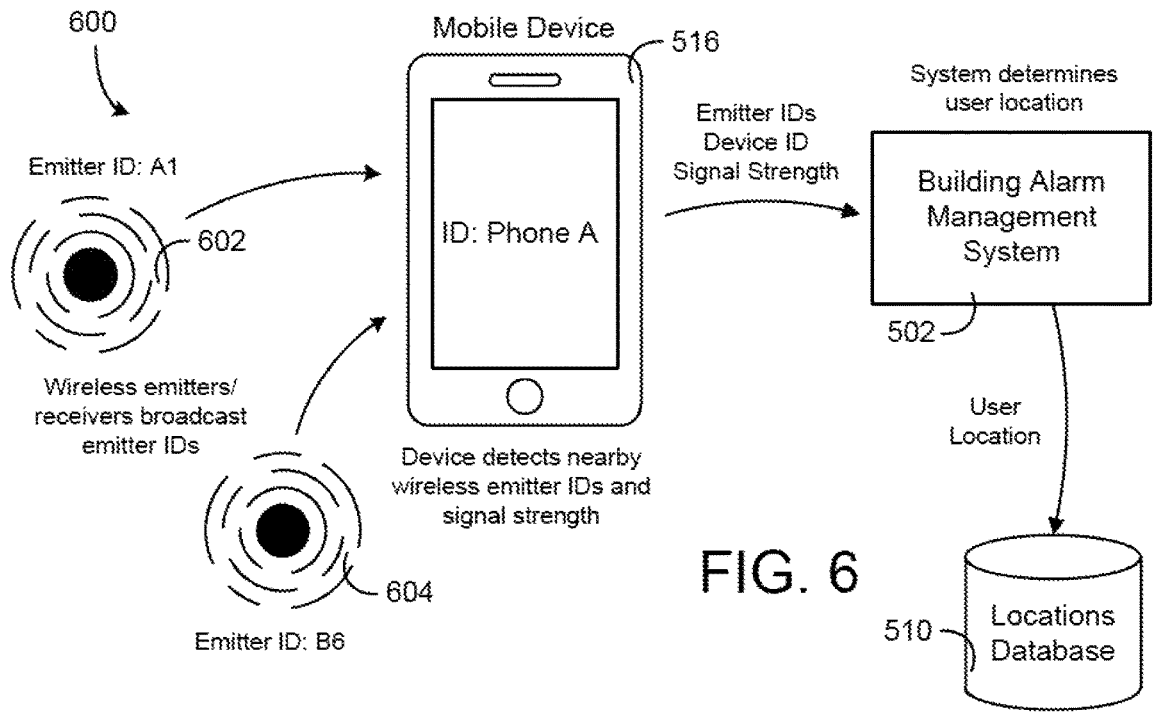
FIG. 6 is block diagram of a system for automatically determining the location of a user device based on signals from wireless emitters detected by the user device, according to an exemplary embodiment.

Referring particularly to FIG. 6, system 600 is shown to include a plurality of wireless emitters/receivers (e.g., wireless emitters/receivers 602 and 604). Emitters/receivers 602/604 may be referred to as wireless modules that are configured to emit and receive wireless signals. Each of the wireless emitters/receivers 602 and 604 can be located at a different position in the building (e.g., inside rooms or zones, at entrance/exit points, in hallways, etc.) and can be associated with a different emitter identifier. The locations of the wireless emitters/receivers can be known to the building alarm management system 502.

The wireless emitters/receivers 602 and 604 can be configured to emit, receive, sense, relay, or otherwise engage in unidirectional or bidirectional wireless communications. The wireless emitters/receivers 602 and 604 can use any type wireless technology or communications protocol. For example, in various embodiments, the wireless emitters/receivers 602 and 604 can be Bluetooth low energy (BLE) emitters, near field communications (NFC) devices, Wi-Fi transceivers, RFID devices, ultrawide band (UWB) devices, infrared emitters/sensors, visible light communications (VLC) devices, ultrasound devices, cellular transceivers, iBeacons, or any other type of hardware configured to facilitate wireless data communications. In some embodiments, the wireless emitters/receivers are integrated with various devices within the building (e.g., thermostats, lighting sensors, zone controllers).

As shown in FIG. 6, each of the wireless emitters/receivers 602 and 604 can broadcast a wireless signal. The wireless signal broadcast by an emitter/receiver of emitters/receivers 602 and 604 can include an indication of the emitter identifier associated with the wireless emitter/receiver. In some embodiments, the wireless signal broadcast by an emitter/receiver of emitters/receivers 602 and 604 includes multiple emitter identifiers (e.g., a UUID value, a major value, a minor value, etc.). A mobile device 516 can detect the wireless signals emitted by the wireless emitter/receivers. The mobile device 516 can be configured to identify the emitter identifier associated with the wireless signal. In some embodiments, the mobile device 516 detects the signal strength of the wireless signals.

The mobile device 516 is associated with device identifier (e.g., "Phone A") that can be used to distinguish the mobile device 516 from other mobile devices. In some embodiments, the mobile device 516 reports the emitter identifiers, the device identifier, and/or the signal strengths associated with the detected wireless signals to the building alarm management system 502. The building alarm management system 502 can use the emitter identifiers to determine a three-dimensional location of the mobile device 516 (e.g., in a particular room or building zone, nearby a particular wireless emitter receiver, etc.). For example, the building alarm management system 502 can use the known locations of the wireless emitters/receivers 602 and 604 to determine a location that is likely to be within range of all the wireless emitters/receivers 602 and 604 detected by the mobile device 516. In other embodiments, the mobile device 516 determines its own three-dimensional location based on the detected emitter identifier(s) and reports the three-dimensional location to the building alarm management system 502. The building alarm management system 502 can be configured to associate the three-dimensional location with the device identifier and to store the association in the locations database.

Figure 7:
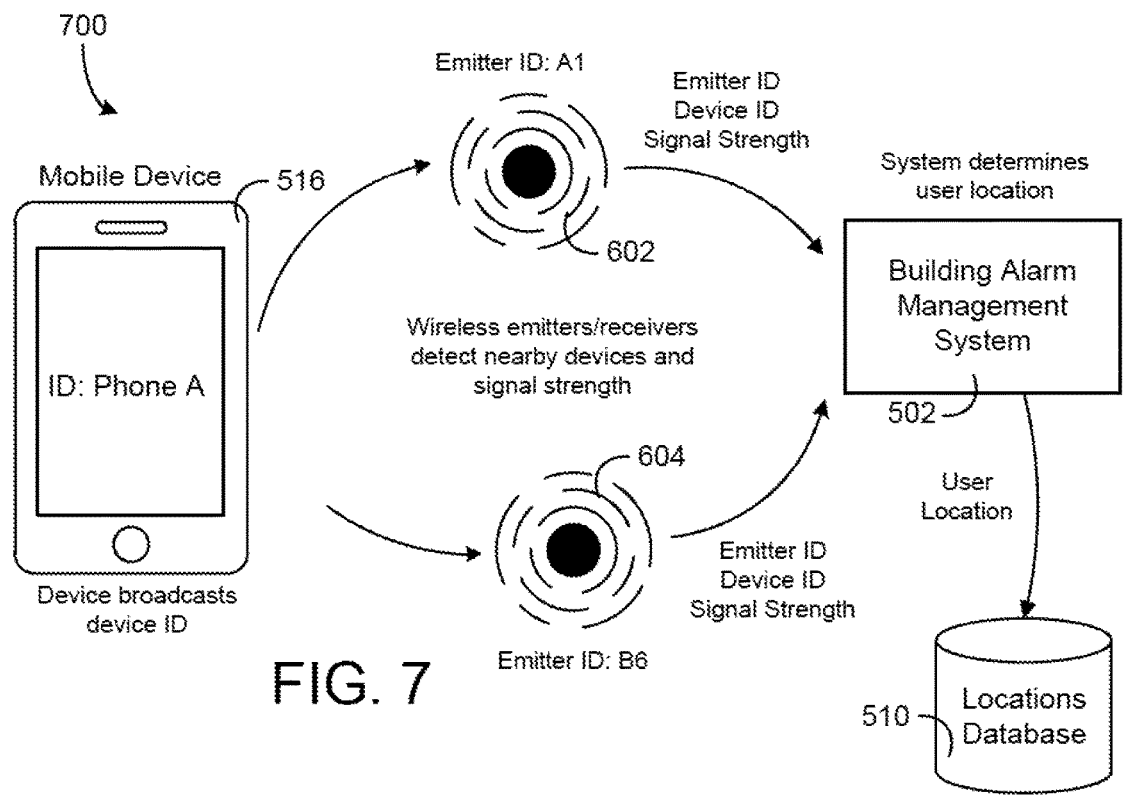
FIG. 7 is block diagram of another system for automatically determining the location of a user device based on signals from the mobile device detected by wireless receivers, according to an exemplary embodiment.

Referring now to FIG. 7, another system 700 for determining mobile device locations is shown, according to an exemplary embodiment. In system 700, the mobile device 516 broadcasts its device ID (e.g., using integrated wireless transmitters). The wireless emitters/receivers 602 and 604 can detect the broadcasted device ID and/or the signal strength associated therewith. The wireless emitters/receivers 602 and 604 can report their own emitter IDs, the detected mobile device IDs, and/or the signal strengths to the building alarm management system. The building alarm management system 502 uses this information to determine a three-dimensional location of the mobile device 516. For example, the building alarm management system 502 can use the known locations of the wireless emitters/receivers 602 and 604 to determine a location that is likely to be within range of all the wireless emitters/receivers 602 and 604 that detect the same mobile device 516. The building alarm management system 502 can be configured to associate the three-dimensional location with the device identifier and to store the association in the locations database.

Figure 8:
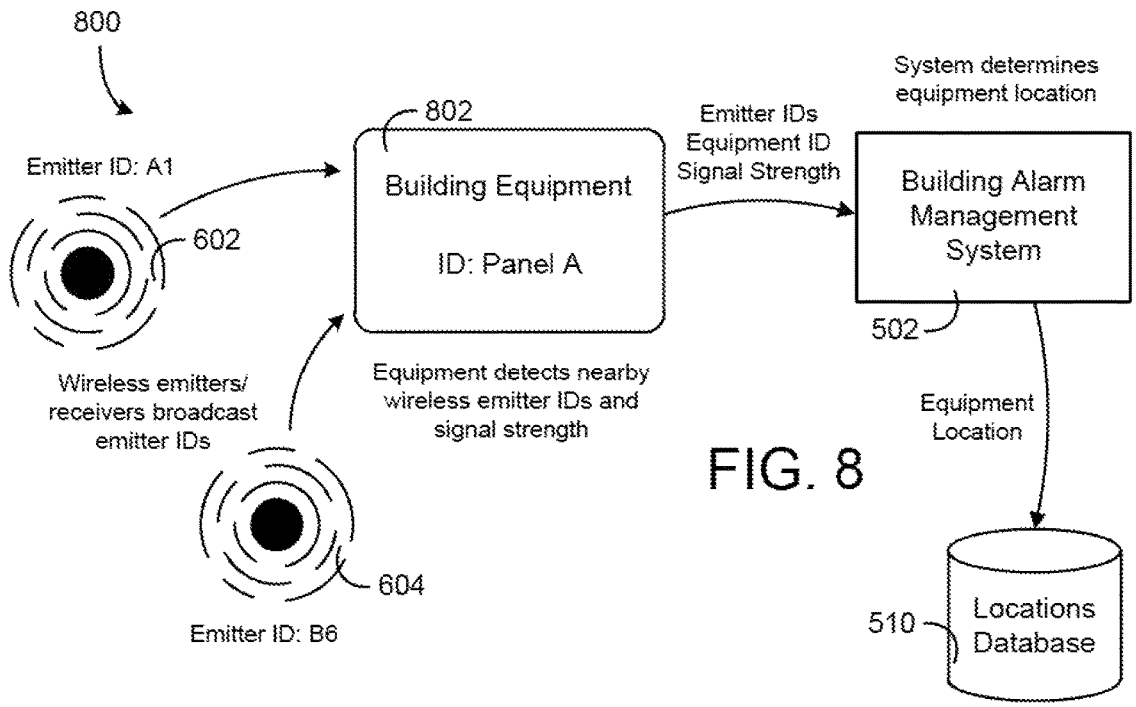
FIG. 8 is block diagram of a system for automatically determining the location of building equipment based on signals from wireless emitters detected by the building equipment, according to an exemplary embodiment.

Referring now to FIG. 8, a system 800 for determining the locations of building equipment 802 is shown, according to an exemplary embodiment. In system 800 each of the wireless emitters/receivers 602 and 604 broadcasts a wireless signal. Building equipment 802 can detect the wireless signals emitted by the wireless emitter/receivers 602 and 604. The equipment 802 can be configured to identify the emitter identifier associated with the wireless signal. In some embodiments, the equipment 802 detects the signal strength of the wireless signals.

The equipment 802 is associated with an equipment identifier (e.g., "Panel A") that can be used to distinguish the equipment from other equipment in the system. In some embodiments, the equipment 802 reports the emitter identifiers, the equipment identifier, and/or the signal strengths associated with the detected wireless signals to the building alarm management system 502. The building alarm management system 502 can use the emitter identifiers to determine a three-dimensional location of the equipment 802 (e.g., in a particular room or building zone, nearby a particular wireless emitter receiver, etc.). For example, the building alarm management system 502 can use the known locations of the wireless emitters/receivers 602 and 604 to determine a location that is likely to be within range of all the wireless emitters/receivers 602 and 604 detected by the equipment 802. In other embodiments, the equipment 802 determines its own three-dimensional location based on the detected emitter identifier(s) and reports the three-dimensional location to the building alarm management system 502. The building alarm management system 502 can be configured to associate the three-dimensional location with the equipment identifier and to store the association in the locations database 510.

Figure 9:
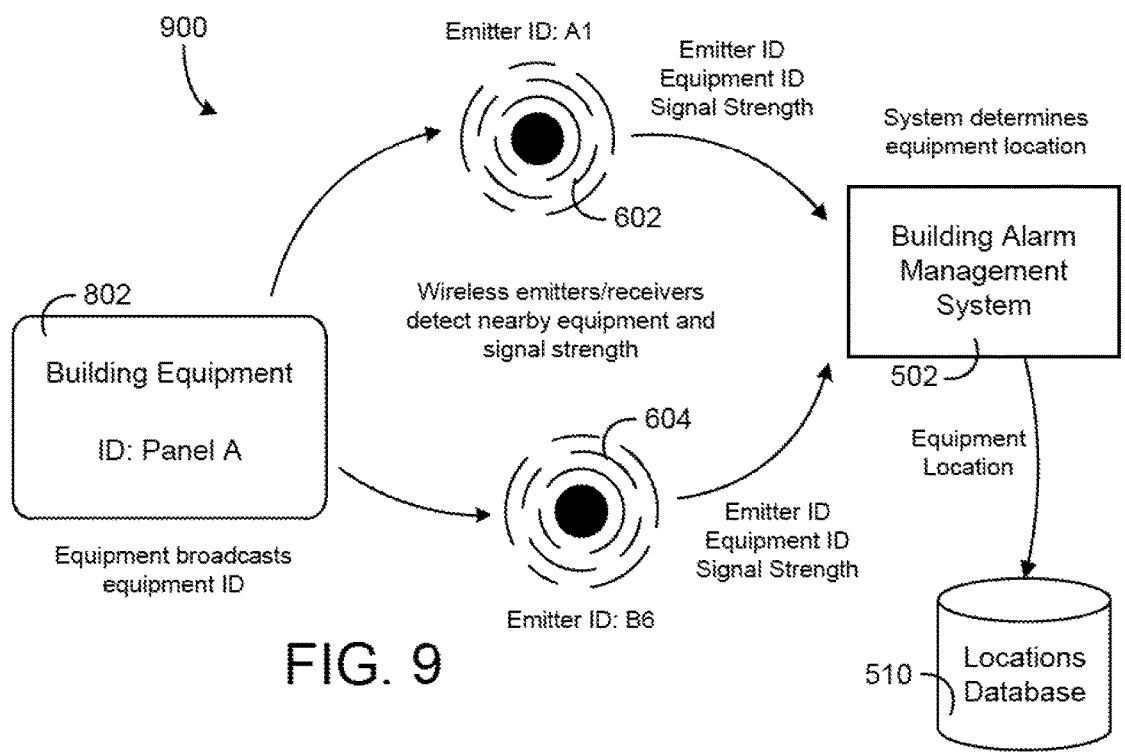
FIG. 9 is block diagram of another system for automatically determining the location of building equipment based on signals from the building equipment detected by wireless receivers, according to an exemplary embodiment.

Referring now to FIG. 9, another system 900 for determining equipment locations is shown, according to an exemplary embodiment. In system 900, the equipment 802 broadcasts its device ID (e.g., using integrated wireless transmitters). The wireless emitters/receivers 602 and 604 can detect the broadcasted device ID and/or the signal strength associated therewith. The wireless emitters/receivers 602 and 604 can report their own emitter IDs, the detected equipment IDs, and/or the signal strengths to the building alarm management system. The building alarm management system 502 uses this information to determine a three-dimensional location of the equipment 802. For example, the building alarm management system 502 can use the known locations of the wireless emitters/receivers 602 and 604 to determine a location that is likely to be within range of all the wireless emitters/receivers 602 and 604 that detect the same equipment. The building alarm management system can be configured to associate the three-dimensional location with the equipment identifier and to store the association in the locations database.

Figure 10:
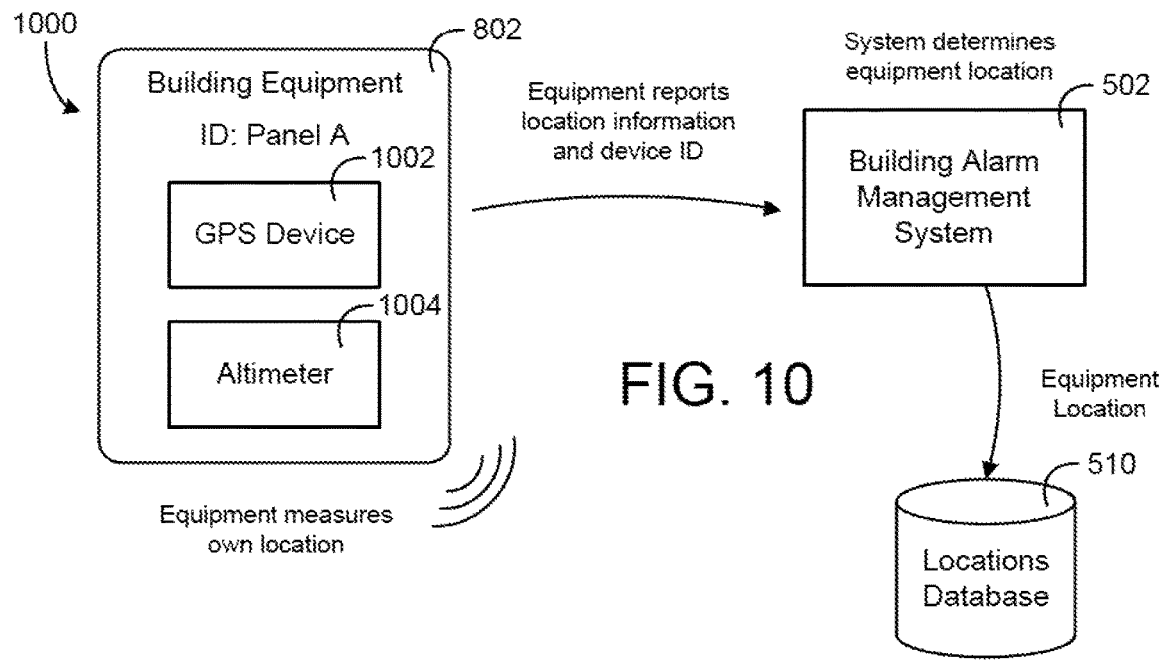
FIG. 10 is a block diagram of another system for automatically determining the location of building equipment based on location measurements from the building equipment, according to an exemplary embodiment.

Referring now to FIG. 10, another system 1000 for determining equipment locations is shown, according to an exemplary embodiment. In system 1000, the building equipment 802 includes integrated location-sensing electronics (e.g., a GPS device 1002, an altimeter 1004, etc.). The equipment 802 can measure its own location using the location electronics and report the location to the building alarm management system 502. The equipment 802 can also report its device identifier. In some embodiments, the equipment 802 reports the location information (e.g., GPS data and altitude data) and the device identifier to the building alarm management system 502. The building alarm management system 502 can use the location information and the device identifier to determine a three-dimensional location of the equipment 802. In other embodiments, the equipment 802 determines its own three-dimensional (i.e., global) position based on the GPS data and altitude data and reports the three-dimensional location to the building alarm management system 502. The building alarm management system 502 can be configured to associate the location with the device identifier and to store the association in the locations database.

Figure 11:
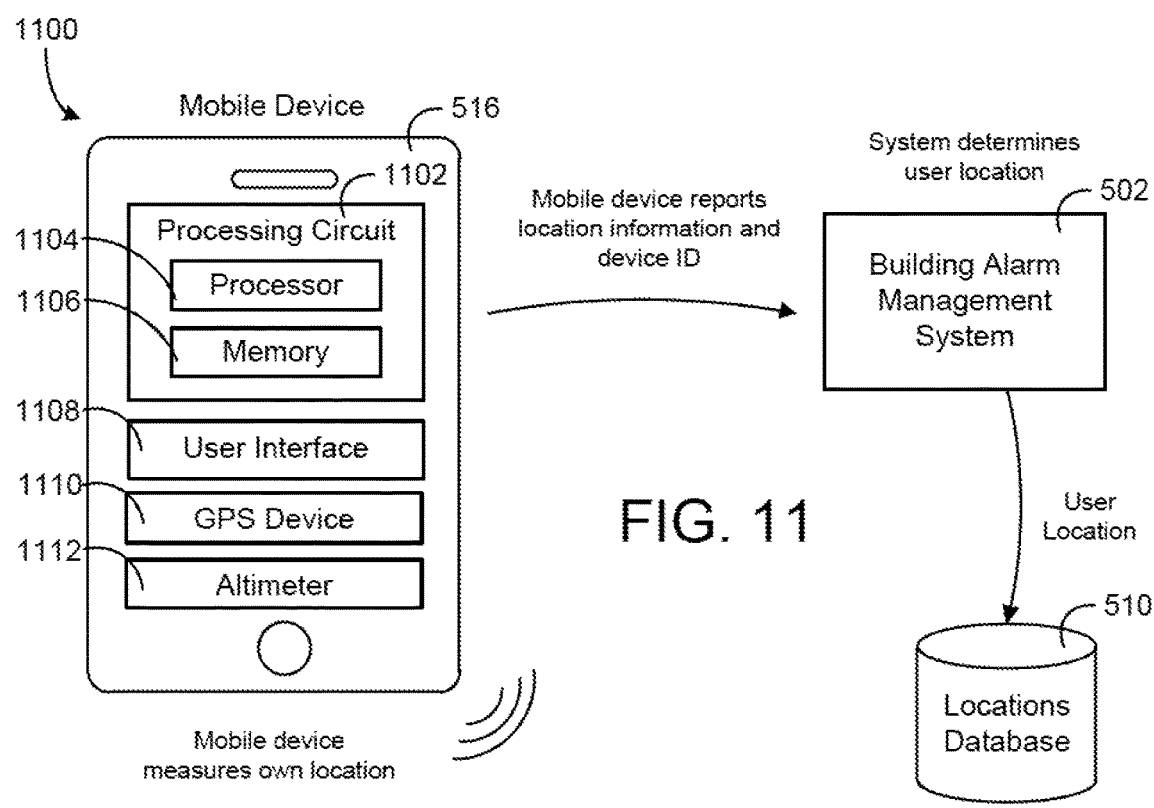
FIG. 11 is a block diagram of another system for automatically determining the location of a mobile device based on location measurements from the mobile device, according to an exemplary embodiment.

Referring now to FIG. 11, another system 1100 for determining user locations is shown, according to an exemplary embodiment. In system 1100, the mobile device 516 includes location-sensing electronics (e.g., a GPS device 1110, an altimeter 1112, etc.). Mobile device 516 can include user interface 1108 and processing circuit 1102. User interface 1108 may be a touch screen and/or one or more buttons that allows a user to view output of mobile device 516 and input information into mobile device 516. Processing circuit 1102 can include processor 1104 and memory 1106. Processing circuit can be configured to perform some and/or all of the functionality of mobile device 516. The mobile device 516 can measure its own location using the location electronics and can report such measurements to the building alarm management system 502. The building alarm management system 502 can use the measured location of the mobile device 516 to determine the location of a user associated with the mobile device 516. For example, the building alarm management system 502 can access a database to identify a particular user associated with the mobile device 516. The building alarm management system 502 can associate the location received from the mobile device 516 with the identified user and store the location in the locations database 510.

In some embodiments, the mobile device 516 is configured to record a GPS location at an entrance of the building. The mobile device 516 can include an accelerometer configured to collect data from which a change in position can be determined. The mobile device 516 or the building alarm management system 502 can combine the GPS location of the building entrance with the change in position of the mobile device from the building entrance to its current location to determine the three-dimensional location of the mobile device 516 within the building.

In some embodiments, the mobile device 516 reports the location information (e.g., GPS data and altitude data) and the device identifier to the building alarm management system 502. The building alarm management system 502 may use the location information and the device identifier to determine a three-dimensional location of the mobile device 516. In other embodiments, the mobile device 516 determines its own three-dimensional (i.e., global) position based on the GPS data and altitude data and reports the three-dimensional location to the building alarm management system 502. The building alarm management system 502 can associate the location with the mobile device 516 and/or a particular user and can store the association in the locations database 510.

Figure 12:
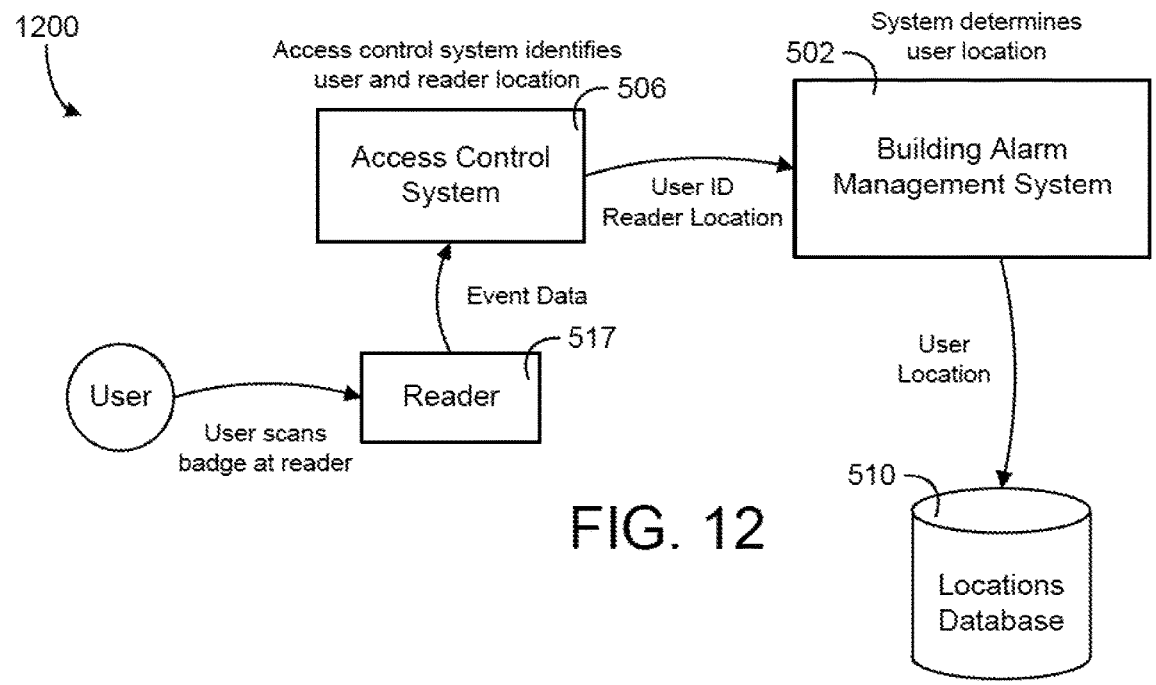
FIG. 12 is a block diagram of a system for determining the location of a user based on event data from an access control system, according to an exemplary embodiment.

Referring now to FIG. 12, another system 1200 for determining user locations is shown, according to an exemplary embodiment. In system 1200, user locations are determined using event data from the access control system 506. For example, a user's location can be identified when the user passes through a security checkpoint or scans a security badge at the reader 517 of the access control system 506. The reader 517 provides event data to the access control system 506 (e.g., badge ID, timestamp, reader ID, etc.). The access control system 506 can use the event data to identify the user and determine the location of the reader at which the badge scan occurred. The access control system 506 can report the user ID and reader location to the building alarm management system 502. The building alarm management system 502 can use the information from the access control system 506 to determine the user's location and can store the user location in the locations database 510.

Figure 13:
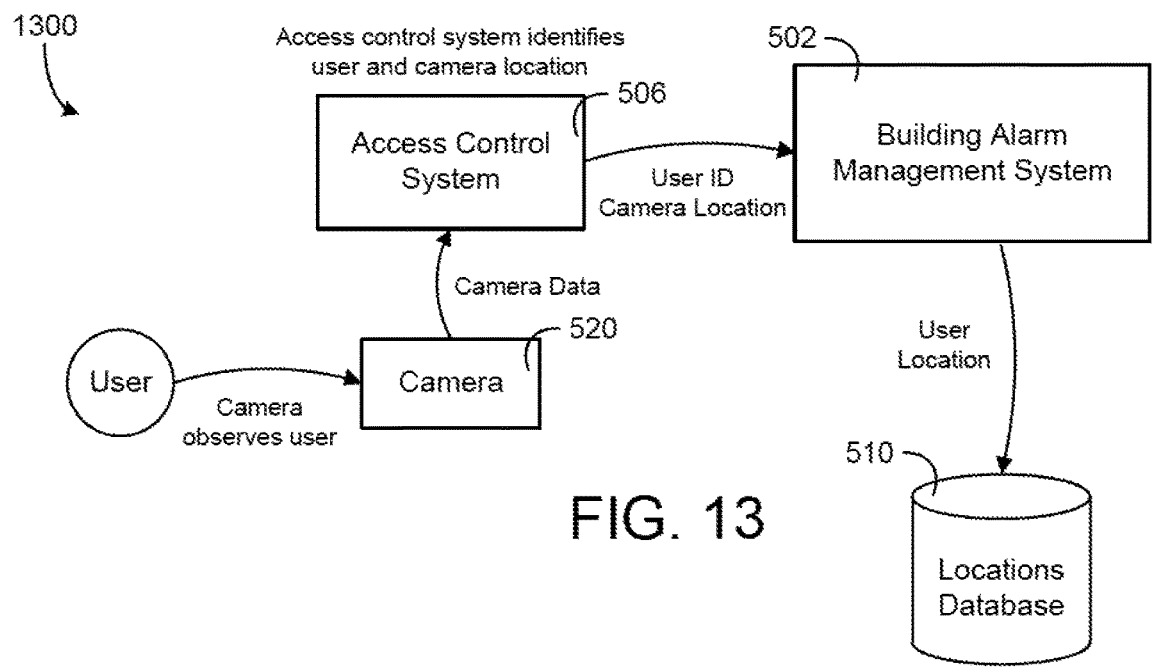
FIG. 13 is a block diagram of another system for determining the location of a user based on camera data from the access control system, according to an exemplary embodiment.

Referring now to FIG. 13, another system 1300 for determining user locations is shown, according to an exemplary embodiment. In system 1300, user locations are determined using camera data from the access control system 506. For example, a user's location can be identified when the camera 520 of the access control system 506 observes the user. The camera 520 provides camera data (e.g., photos, video, etc.) to the access control system 506. The access control system 506 can use the camera data to identify the user (e.g., using facial recognition techniques) and determine the location of the camera 520 that observed the user. The access control system 506 can report the user ID and the camera location to the building alarm management system 502. The building alarm management system 502 can use the information from the access control system 506 to determine the user's location and can store the user location in the locations database 510.

Targeted Alarm Examples

Figure 14:
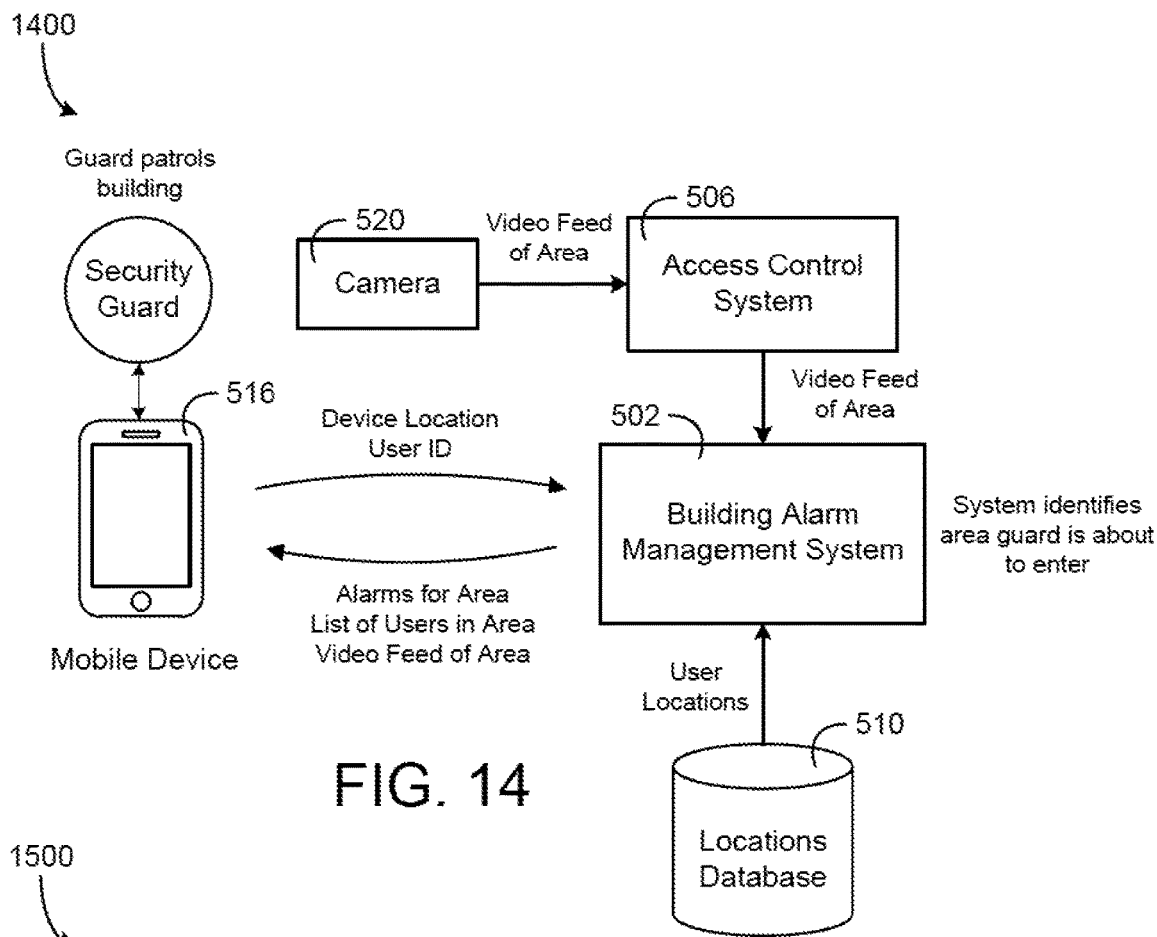
FIG. 14 is a block diagram illustrating a guard tour implementation of the building alarm management system, according to an exemplary embodiment.
Figure 15:
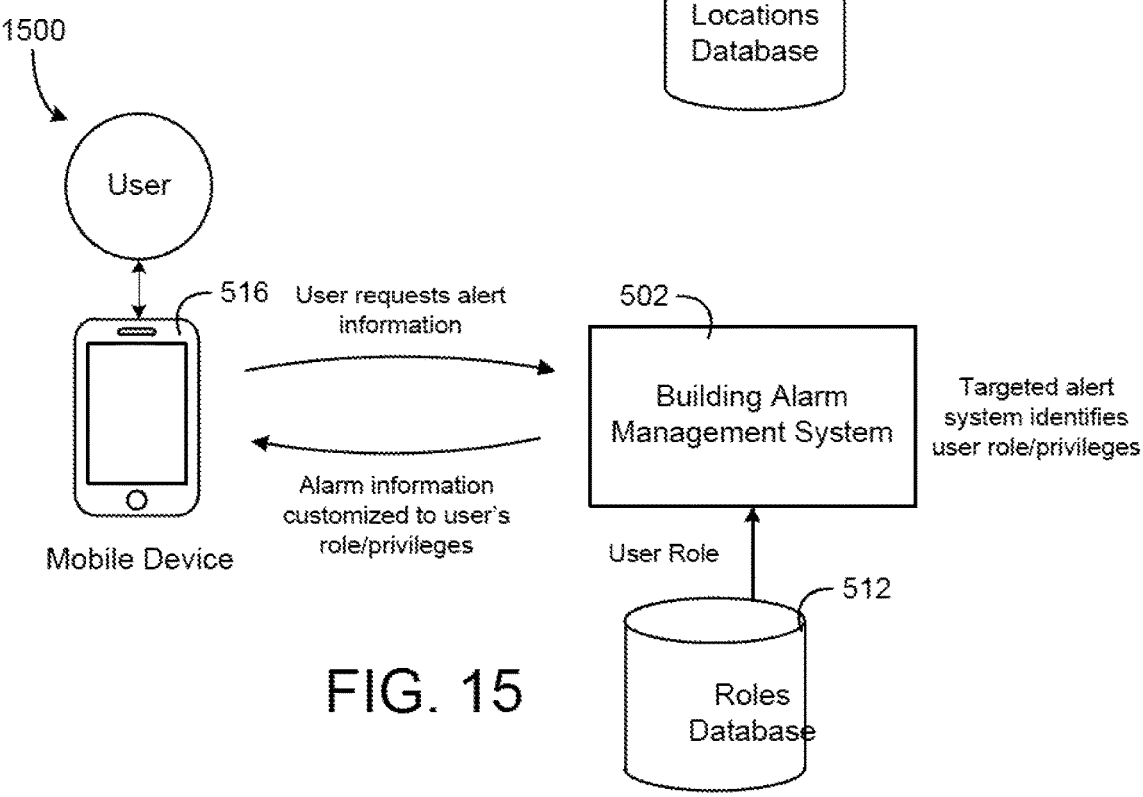
FIG. 15 is a block diagram illustrating how the building alarm management system responds to requests for alarm information, according to an exemplary embodiment.

Referring now to FIGS. 14-15, example implementations of the building alarm management system 502 are shown. Referring particularly to FIG. 14, a block diagram 1400 illustrating a guard tour implementation is shown, according to an exemplary embodiment. A security guard patrols the building while carrying the mobile device 516. The location of the mobile device 516 (and thus the location of the security guard) can be determined using any of the systems previously described. The building alarm management system 502 can monitor the security guard's location and provide the security guard with role-specific alarms and other notifications that depend on the security guard's current location.

In some embodiments, the building alarm management system 502 uses the location of the mobile device 516 over time (e.g., a location history or trajectory) to identify an area that the security guard is about to enter. A history of past locations of the mobile device 516 can be retrieved from the locations database 510 to determine the path that the security guard has taken. The building alarm management system 502 can determine the area that the security guard is about to enter using the history of past locations in combination with the current location of the mobile device 516. Such information can indicate a movement vector or path that leads toward the location the security guard is about to enter. The area can be an area of a building (e.g., a specific room or zone) or an outdoor area.

The building alarm management system 502 can provide the security guard with relevant information pertaining to the area that the security guard is about to enter. For example, the building alarm management system 502 can provide the security guard with a list of alarms for the area, a list of users in the area along with their photos, a video feed from a camera that monitors the area, or other status information for the area. This allows the security guard to be prepared for area that the security guard is about to enter. In some embodiments, the building alarm management system 502 provides the security guard with a map of the building (e.g., a floorplan view) with the current location of the security guard marked on the map. As the security guard moves through the building, the location can be dynamically updated with the new location of the security guard.

In some embodiments, the building alarm management system 502 is configured to provide directions to specific areas based on the current location of the mobile device 516. The directions can include step-by-step instructions similar to the instructions provided by a vehicle navigation system. Advantageously, the ability to automatically identify the location of the mobile device 516 allows the building alarm management system 502 to direct the user to a specific location in the building. This feature can also be used by other users who may not be familiar with the layout of the building (e.g., delivery personnel, visitors, contractors, etc.) to find specific rooms or locations.

Referring now to FIG. 15, a block diagram 1500 illustrating how the building alarm management system 502 responds to requests for alarm information is shown, according to an exemplary embodiment. Different users can have access to different assets, which can be defined by the user's role. When a user requests alarm information from the building alarm management system 502, the building alarm management system 502 can access the roles database 512 to identify the user's role and/or privileges. The building alarm management system 502 can then provide the user with alarm information customized to the user's role and/or privileges. For example, a maintenance worker entering an area can be provided with a list of alarms relating to equipment that require maintenance. In the event of a fire or other emergency, emergency personnel entering the area can be provided with a list of users still in the area along with their photos. The ability to provide users with customized alarms based on their role and current location allows for targeted distribution of information relevant to the user at the time.

Building Alarm Management System

Figure 16:
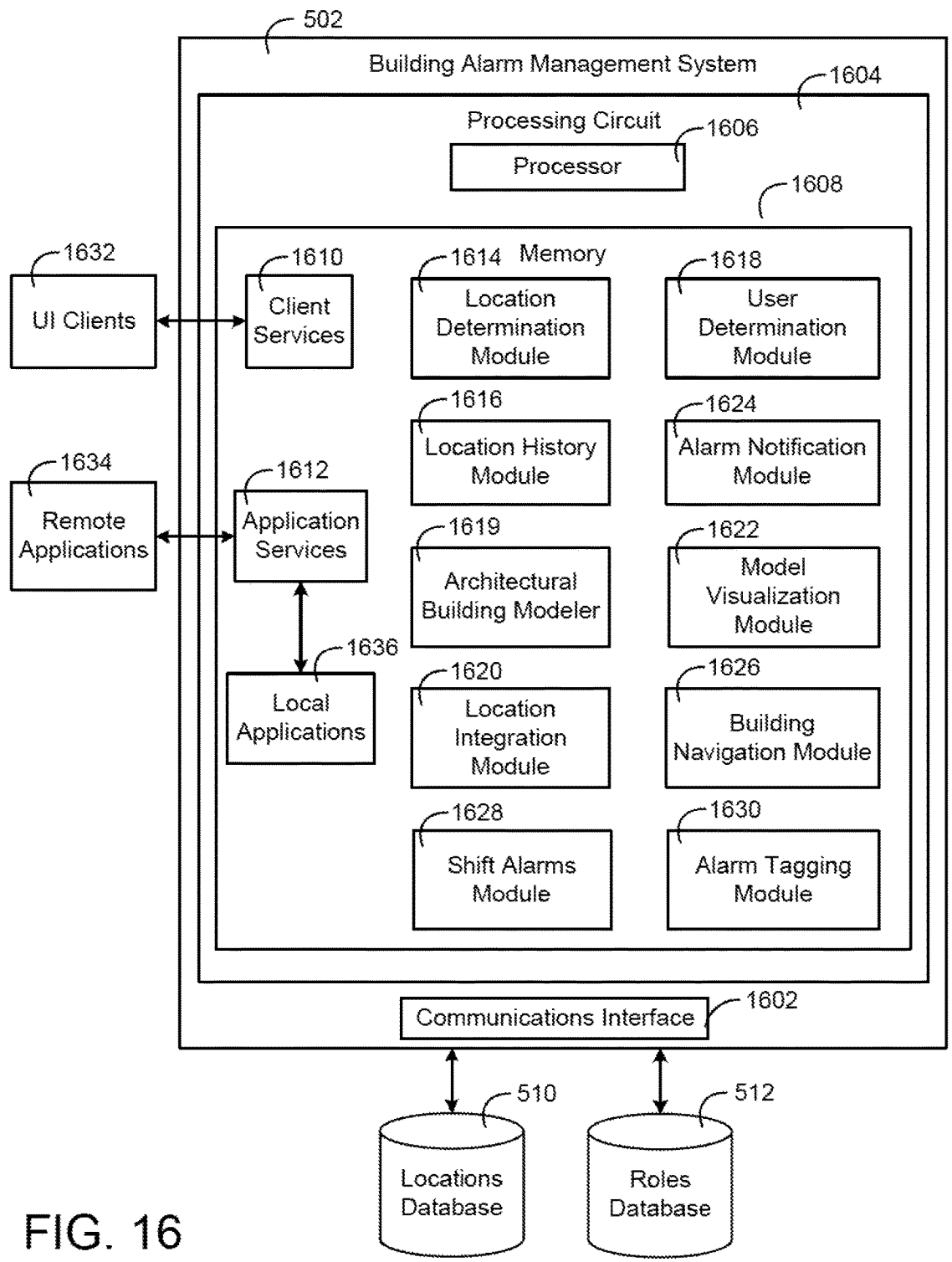
FIG. 16 is a block diagram illustrating the building alarm management system in greater detail, according to an exemplary embodiment.

Referring now to FIG. 16, a block diagram illustrating the building alarm management system 502 in greater detail is shown, according to an exemplary embodiment. The building alarm management system 502 is shown to include a communications interface 1602 and a processing circuit 1604. The communications interface 1602 can include wired or wireless interfaces (e.g., jacks, antennas, transmitters, receivers, transceivers, wire terminals, etc.) for conducting data communications with various systems, devices, or networks. For example, the communications interface can include an Ethernet card and port for sending and receiving data via an Ethernet-based communications network. As another example, the communications interface 1602 can include a Wi-Fi transceiver for communicating via a wireless communications network.

The communications interface 1602 can be configured to communicate via local area networks (e.g., a building LAN), wide area networks (e.g., the Internet, a cellular network, etc.), and/or conduct direct communications (e.g., NFC, Bluetooth, etc.). In various embodiments, the communications interface 1602 can be configured to conduct wired and/or wireless communications. In some embodiments, the communications interface 1602 includes an application gateway configured to receive input from applications running on client devices. For example, the communications interface 1602 can include one or more wireless transceivers (e.g., a Wi-Fi transceiver, a Bluetooth transceiver, a NFC transceiver, a cellular transceiver, etc.) for communicating with mobile devices.

The processing circuit 1604 is shown to include a processor 1606 and memory 1608. The processor 1606 can be a general purpose or specific purpose processor, an application specific integrated circuit (ASIC), one or more field programmable gate arrays (FPGAs), a group of processing components, or other suitable processing components. The processor 1606 is configured to execute computer code or instructions stored in memory or received from other computer readable media (e.g., CDROM, network storage, a remote server, etc.).

The memory 1608 can include one or more devices (e.g., memory units, memory devices, storage devices, etc.) for storing data and/or computer code for completing and/or facilitating the various processes described in the present disclosure. The memory 1608 can include random access memory (RAM), read-only memory (ROM), hard drive storage, temporary storage, non-volatile memory, flash memory, optical memory, or any other suitable memory for storing software objects and/or computer instructions. The memory 1608 can include database components, object code components, script components, or any other type of information structure for supporting the various activities and information structures described in the present disclosure. The memory 1608 can be communicably connected to the processor 1606 via the processing circuit 1604 and can include computer code for executing (e.g., by the processor) one or more processes described herein. When the processor 1606 executes instructions stored in memory 1608, the processor 1606 generally configures the building alarm management system 502 (and more particularly the processing circuit 1604) to complete such activities.

Still referring to FIG. 16, the building alarm management system 502 is shown to include client services 1610 and application services 1612. Client services 1610 can be configured to facilitate interaction and/or communication between the building alarm management system 502 and various internal or external clients or applications (e.g., UI clients 1632). For example, client services 1610 can include web services or application programming interfaces available for communication by UI clients and remote applications (e.g., applications running on a mobile device, energy monitoring applications, applications allowing a user to monitor the performance of the building alarm management system 502, automated fault detection and diagnostics systems, etc.). Application services 1612 may facilitate direct or indirect communications between remote applications 1634, local applications 1636, and the building alarm management system 502. For example, application services 1612 may allow the building alarm management system 502 to communicate (e.g., over a communications network) with remote applications 1634 running on mobile devices and/or with a BAS controller. Remote applications 1634 may be applications such as alarm notifier application 518 and/or equipment finder application 520 as described with reference to FIG. 5 and elsewhere herein.

In some embodiments, application services 1612 provide an applications gateway for conducting electronic data communications with UI clients 1632 and/or remote applications 1634. For example, application services 1612 can be configured to receive communications from the mobile devices 516 and/or building equipment. Communications can include detected emitter identifiers, GPS data, altimeter data, accelerometer data, and/or other data from mobile devices and/or building equipment. Client services 1610 can provide client devices with a graphical visualization (e.g., a three-dimensional model, an augmented reality overlay, a map, etc.) of the building with the locations of various users and devices (e.g., building equipment, mobile devices, user devices, etc.) represented in the graphical visualization (described in greater detail below).

Still referring to FIG. 16, the building alarm management system 502 is shown to include a location determination module 1614. The location determination module 1614 can be configured to determine the location of users and building equipment in or around the building. In some embodiments, the location determination module 1614 determines the location of users based on information received from mobile devices carried by the users. Similarly, the location determination module 1614 can determine the locations of building equipment device based on information received from the building equipment. For example, the location determination module can receive one or more emitter identifiers reported by the mobile devices and/or building equipment, as described with reference to FIGS. 6-9. For ease of explanation, both mobile devices and building equipment will be referred to as "tracked devices" for the remainder of this disclosure.

The location determination module 1614 can receive a single emitter identifier from the tracked devices or multiple emitter identifiers from the tracked devices. For example, a tracked device can report the emitter identifier associated with each wireless signal (e.g., from one of the wireless emitters/receivers 602 and 604) that is detected by the tracked device. If the tracked device is within range of multiple wireless emitters/receivers, the tracked device can report multiple emitter identifiers. For embodiments in which the tracked device reports multiple emitter identifiers, each emitter identifier can be reported in conjunction with signal strength. The signal strength associated with an emitter identifier can indicate a relative proximity of the tracked device to the corresponding wireless emitter (e.g., high signal strengths indicating a closer proximity and low signal strengths indicating a more distant proximity).

The location determination module 1614 can determine the location of a tracked device based on the emitter identifier or emitter identifiers received from the tracked device. In some embodiments, the location determination module 1614 uses the emitter identifier(s) received from a tracked device to determine which of the plurality of the wireless emitters/receivers 602 and 604 is closest to the tracked device (e.g., based on signal strength, triangulation, etc.). For example, the location determination module 1614 can use an emitter identifier received from a tracked device as an input to a relational database (e.g., a lookup table, a device mapping, etc.). Each emitter identifier can uniquely indicate a particular wireless emitter (e.g., by emitter device name, by serial number, etc.) and/or a particular location (e.g., a zone name, a zone identifier, etc.) in the relational database.

In some embodiments, the location determination module 1614 receives GPS data and/or altimeter data from the tracked device. For example, various tracked devices can be equipped with GPS receivers and/or altimeters (e.g., GPS device 1002, altimeter 1004, GPS device 1110, and altimeter 1112). The tracked devices can report location information (e.g., GPS data and altitude data) and a device identifier to the location determination module. The location determination module 1614 can use the location information and the device identifier to determine a three-dimensional location of the tracked device. The location determination module 1614 can be configured to associate the three-dimensional location with the device identifier and to store the association in a locations database.

In some embodiments, the location determination module 1614 receives GPS data and/or altimeter data from a tracked device. In some embodiments, the tracked device records a GPS location and/or altitude an entrance of the building (e.g., for embodiments in which the GPS signal is too weak to determine obtain a GPS measurement within the building). The tracked device can include an accelerometer configured to collect data from which a change in position can be determined. The tracked device can report the accelerometer data to the location determination module. The location determination module 1614 can combine the location information at the building entrance with the change in position between the building entrance and the location of the tracked device to determine the three-dimensional location of the tracked device within the building.

Still referring to FIG. 16, the building alarm management system 502 is shown to include a location history module 1616. The location history module 1616 can be configured to create and/or manage a location history for tracked devices within building the (e.g., BAS devices, mobile devices, client devices, etc.). A location history for a tracked device can include a series of locations (e.g., determined by the location determination module) at which the device has been located in the past. The location history module 1616 can record the locations determined by the location determination module 1614 for each device in a database such that a location history for a particular device can be constructed.

The location history for a mobile device can facilitate automatically providing the mobile device with alarms a particular room or zone in a building, even if the mobile device is not currently in the room or zone. For example, the location history for a mobile device can be used to provide a user with a list of alarms for an area that the user device is about to enter, an area in which the mobile device was previously located, or an area in which the mobile device is currently located. This feature provides a user with alarms that may be relevant to the user in the near future (e.g., if the user is headed toward the area) prior to the user reaching the area.

In some embodiments, the location history module 1616 stores each location in the location history with a corresponding time parameter. The time parameter can be combined with the three-dimensional location information for a tracked device to generate four-dimensional coordinates for a device (e.g., three location coordinates and a time coordinate; two location coordinates, a floor parameter, and a time parameter, etc.). In some embodiments, the location history module 1616 stores each location determined by the location determination module as an event. Each event can include location information (e.g., two-dimensional or three-dimensional location coordinates, etc.), a time parameter (e.g., identifying a time at which the mobile device was located at the indicated location), and a device ID parameter (e.g., indicating a particular device). By storing each location as an event, the location history module 1616 can maintain a historical record of the location of a tracked device over a period of time.

In some embodiments, the location history module 1616 is configured to use the location history for a tracked device to reconstruct a route that the tracked device travels within the building. For example, the location history module 1616 can use the location history for a tracked device assigned to security personnel to determine whether the security personnel have physically traveled to various locations within the building at the appropriate times (e.g., for performing security checks, for personnel management, for responding to emergencies, etc.). As another example, the location history for a tracked device can allow a user's route from one building zone to another building zone to be reconstructed. This feature can be useful for providing navigation instructions (e.g., directions from one room in the building to another, directions to a tracked device, etc.) for situations in which a user is not familiar with a layout of the building. The location history for a tracked device can also be used in the event of an emergency (e.g., a fire or fire drill) to determine whether all users who entered the building on a particular day (e.g., the day of the emergency) have been safely evacuated.

Still referring to FIG. 16, the building alarm management system 502 is shown to include a user determination module 1618. The user determination module 1618 can be configured to identify a user associated with a tracked device. The user associated with the tracked device may be, for example, a user of a tracked mobile device. In some embodiments, the tracked devices report a device identifier (e.g., a MAC address, an IP address, a device name, etc.) and/or user identifier (e.g., a user name, a login ID, a user group, etc.) to the building alarm management system 502. The user determination module can use the device identifier and/or user identifier to identify a particular user or user account associated with the tracked device.

Different users can have different access permissions and/or privileges for viewing or responding to alarms. For example, a system administrator or service technician may be authorized view equipment maintenance alarms whereas other users may not have such access. The identity of the user associated with the tracked device can be used to select a set of alarms to provide to the mobile device.

In some embodiments, the user identity determined by the user determination module 1618 can be used to automatically adjust control parameters for the corresponding building zone (e.g., the zone in which the user is located). For example, a user's identity can be used to identify the user's preferred environment conditions (e.g., temperature conditions, air flow conditions, etc.) for a building zone. When the user enters a building zone, the identity of the user can be used to automatically adjust control setpoints (e.g., temperature setpoints, flow rate setpoints, etc.) for the building zone to the user's preferred values. In some embodiments, if two or more users with conflicting preferences are located within the same building zone, the user identities determined by the user determination module 1618 can be used to select one set of preferred control parameters over another (e.g., based on user authority levels, based on which user is higher ranking in an organization, etc.).

In some embodiments, the user identity determined by the user determination module 1618 can be used to provide the user with a set of alarms customized to the user's role. For example, a user identified as a security guard can be provided with customized alarms related to building security, whereas a user identified as a maintenance worker can be provided with a customized set of alarms related to equipment maintenance. In the event of an emergency, the user identity can be used to determine whether the user has special skills that can assist with the emergency (e.g., first aid training, CPR training, etc.).

Still referring to FIG. 16, the building alarm management system 502 is shown to include an architectural building modeler 1619. The architectural building modeler 1619 can be configured to generate or obtain a three-dimensional architectural model of the building. The architectural building model may specify the physical structures and dimensions of the building (e.g., interior and exterior wall locations, window locations, stair/elevator locations, room dimensions, etc.). In some embodiments, the architectural building modeler 1619 uses existing blueprints or floor plans for the building to generate the architectural building model. For example, the architectural building modeler 1619 can receive a scanned or imported image of a blueprint or floor plan. The architectural building modeler 1619 can analyze the blueprints or floor plans to generate a three-dimensional model of the building. In other embodiments, the architectural building modeler 1619 imports the three-dimensional model from a CAD file (e.g., .dxf drawings) or drawing generated by architecture software or design software.

In some embodiments, the architectural building modeler 1619 can be used to create a new architectural building model (e.g., generating a new model based on user input). For example, a user may interact with the architectural building modeler 1619 to specify building dimensions (e.g., overall building dimensions, room dimensions, wall locations, etc.) and other physical or architectural attributes of the building.

In some embodiments, the architectural building modeler 1619 generates a new architectural building model based on optical imaging or other automated measurements of the building. For example, a mobile device can be used to measure wall locations and other physical structures (e.g., door locations, ceiling heights, stair locations, etc.) within the building using any of a variety of positioning or ranging techniques (e.g., optical sensing, radar, sonar, lidar, etc.). The location of the tracked device can be determined using any of the methods described above with reference to the location determination module.

The tracked device can report location information (e.g., GPS coordinates, accelerometer data, altitude data, etc.), orientation information (e.g., a direction that the mobile device is facing) and structure detection information to the architectural building modeler 1619 at multiple different locations within the building. The architectural building modeler 1619 can generate a three-dimensional building model based on the location/orientation of the mobile device and the measured distances to various structures within the building at each of a plurality of measurement locations. The architectural building modeler 1619 can store the architectural building model in a database.

Still referring to FIG. 16, the building alarm management system 502 is shown to include a location integration module 1620. The location integration module 1620 can be configured to integrate (e.g., apply, combine, merge, etc.) the architectural building model provided by the architectural building modeler 1619 with the tracked device location information provided by the location determination module. For example, the location information provided by the location determination module can define the locations of tracked devices as points floating in three-dimensional space. The location integration module 1620 can apply the locations of the tracked devices to the architectural building model to map each three-dimensional location to a particular location within the building.

In some embodiments, the tracked device location information defines the locations of the tracked devices according to a first coordinate system and the architectural model defines the architecture of the building according to a second coordinate system. The location integration module 1620 can merge the first coordinate system with the second coordinate system to generate an integrated model that includes both a three-dimensional architectural representation of the building and the locations of various tracked devices.

In some embodiments, the location integration module 1620 receives calibration data. The calibration data can identify a point in the building architectural model (e.g., a three-dimensional location) that corresponds to a particular point relative to the locations of the tracked devices (i.e., a shared point between the first coordinate system and the second coordinate system). The calibration data can include multiple calibration points measured at various locations in or around the building (e.g., a location measured at a southwest corner of the building, a location measured at a northeast corner of the building, etc.). The location integration module 1620 can use the calibration data to scale and/or orient the building architectural model relative to the floating points representing the three-dimensional locations of various tracked devices. The location integration module 1620 can generate an integrated building model (e.g., a three-dimensional architectural model) that defines the architecture of the building and specifies the locations of tracked devices relative to the architecture of the building (e.g., within a wall, in a particular room or zone, on the roof, etc.).

Still referring to FIG. 16, the building alarm management system 502 is shown to include a model visualization module 1622. The model visualization module 1622 can be configured to generate or provide a graphical user interface (GUI) for visualizing the integrated model generated by the location integration module 1620. The model visualization module 1622 can generate a GUI that includes a three-dimensional architectural model of the building with the locations of various tracked devices represented visually in the three-dimensional architectural model. The location of each tracked device can be shown relative to the architecture of the building.

In some embodiments, the model visualization module 1622 represents tracked devices using three-dimensional objects in the graphical visualization. For example, the model visualization module 1622 can access the device identifiers stored in the locations database to identify a type of device located at each of the indicated locations in the integrated model. The model visualization module 1622 can retrieve three-dimensional representations of one or more device types (e.g., a CAD model of a chiller, a CAD model of an AHU, etc.) and insert the three-dimensional representations at the specified locations in the integrated model. For example, the model visualization module 1622 can represent a chiller in the graphical visualization using a three-dimensional model of a chiller positioned at the location in the building associated with the chiller. Similarly, the model visualization module 1622 can retrieve photos or other information for users in the room and insert the photos into the three-dimensional model.

Still referring to FIG. 16, the building alarm management system is shown to include an alarm notification module 1624. The alarm notification module 1624 can be configured to provide notifications (e.g., messages, alarms, information, etc.) to tracked devices based on the locations of the tracked devices and/or the roles associated with users of the tracked devices. For example, if a hazardous condition (e.g., a fire, a chemical spill, a security event, etc.) is detected in the building, the alarm notification module can send a notification to users that may be affected by the hazardous condition based on the location of the users. The notification can include, for example, evacuation instructions, response instructions, or other instructions for handling the hazardous condition.

The alarm notification module 1624 can receive device location information from the location determination module and/or user identity information from the user determination module. The alarm notification module 1624 can generate and/or distribute customized notifications to tracked devices based on the locations of tracked devices and/or the identities of users associated with the tracked devices (e.g., based on the users' role). For example, if a security event is detected in the building (e.g., an unauthorized entry), the alarm notification module can send a customized notification to security personnel with specific instructions for handling the security event. The instructions provided to tracked devices associated with security personnel can be based on the locations of the tracked devices with respect to the security event. For example, security personnel located close to the event may receive a first set of instructions, whereas security personnel located further from the event may receive a second set of instructions. Additionally, the instructions provided to tracked devices associated with security personnel may be different than the instructions provided to tracked devices associated with other building occupants.

Still referring to FIG. 16, the building alarm management system 502 is shown to include a building navigation module 1626. The building navigation module 1626 can be configured to generate navigation information for a tracked device based on the location of the tracked device within the building. For example, the building navigation module 1626 can generate display data for presentation on a mobile device which includes a map of the building. The building navigation module 1626 can receive location information from the location determination module and use the location information to mark the location of the tracked device on the map. Advantageously, the information generated by the building navigation module can facilitate intra-building navigation of the building (e.g., navigation between rooms or zones of a building).

In some embodiments, the building navigation module 1626 generates navigation instructions. For example, the building navigation module 1626 can generate directions for traveling from one room or zone of the building to another room or zone of the building. The directions generated by the building navigation module 1626 can be similar to driving directions generated by a GPS navigation unit. However, the directions generated by the building navigation module 1626 can be based on the layout of the building and the location of tracked devices with respect to wireless emitters. This feature may be useful for facilitating navigation within the building for users who are not familiar with a layout of the building.

In some embodiments, the building navigation module 1626 generates a user interface for presentation on a mobile device which includes a highlighted route from a current location of the mobile device (e.g., determined by the location determination module 1614) to a destination location (e.g., provided or selected by a user). The destination location can be selected from a list of previous locations of the mobile device or can be provided by a user. For example, a user can select or input the name or number of a particular room or zone of the building into a mobile device. The building navigation module can use the current location of the mobile device to generate navigation instructions (e.g., step-by-step instructions, a highlighted route, an interactive map, etc.) for traveling from the current location of the mobile device to the destination location provided and/or selected by the user.

Still referring to FIG. 16, a shift alarms module 1628 is shown to be included in the building alarm management system 502. The shift alarm module 1628 can be configured to receive input indicating various work shifts of one or more users. The shift alarm module 1628 can be configured to cause the work shift information to be stored in the roles database 512 for each worker of the building. In some embodiments, the shift information may indicate the days and times that a worker is working in the building. In some embodiments, the work shifts stored by the roles database 512 are stored as a single data structure indicating the working days and times of all employees that work inside a building.

The shift alarms module 1628 can be configured to record alarms for a particular user when the user is not on their shift. In response to a user beginning their shift in the building, and logging into a software application such as alarm notifier application 518, the shift alarms module 1628 can be configured to cause the alarm notifier application 518 to display alarm information that it has recorded. In this regard, a user can view all and/or some of the alarms that have occurred in the building since their last work shift. In some embodiments, based on the roles, the alarms recorded since a user's last shift are recorded based on roles for the user. For example, for a security guard role, the shift alarm module 1628 can be configured to record all security related alarms so that when a security guard starts their work shift, the security guard can view all of the security related alarms that have occurred since the security guard's last shift. For a maintenance worker, the shift alarms module 1628 can be configured to record building equipment related alarms so that when the maintenance worker starts their shift, they may see all of the building equipment related alarms that have occurred since the maintenance worker was last working.

In some embodiments, a user may indicate via a mobile device, to begin logging all alarms that occur outside of the working hours of the user. In some embodiments, the user subscribes to the logging of the alarms and/or subscribes to push notifications that the shift alarms module 1628 can be configured to send to the mobile device of a user. In some embodiments, one or more users can subscribe to other shift logs of other users. For example, a manager may subscribe to the shift logs of one or more employees to determine the performance of the building when the employees are not at the building.

Still referring to FIG. 16, an alarm tagging module 1630 is shown to be included in the building alarm management system 502. The alarm tagging module 1630 can be configured to receive notes from a user and store the notes. Further, based on tagged users in the note, the alarm tagging module 1630 can be configured to identify the tagged user and push a notification message to the tagged user. In some embodiments, the alarm tagging module 1630 can be configured to cause a user interface of an software application (e.g., alarm notifier application 518) to display a list of notes that a particular user has been tagged in (e.g., the user that is currently logged into the application).

For example, the alarm tagging module 1630 can be configured to receive a service note from a mobile device (e.g., mobile devices 516), the service note tagging one or more users in the note. The alarm tagging module 1630 can be configured to store the service note. Alarm tagging module 1630 can be configured to determine the identity of the tagged user. In some embodiments, the tag includes a name of the user, a handle of the user, etc. The names and/or handles of the user may be stored in the roles database 512. The alarm tagging module 1630 can be configured to cause the mobile device of the tagged user to receive and/or display the service note.

In another example, a user may tag another user in various alarms or alarm types. For example, a user may indicate to the alarm tagging module 1630 via a mobile device that a particular user or users should be tagged in a certain alarm. The alarm may be a certain type (e.g., security, fire, building equipment) or for a certain piece of building equipment (e.g., a certain control, building system, etc.). In response to receiving an alarm, alarm tagging module can be configured to cause the mobile device of the tagged user to display the alarm and any other relevant alarm information.

Alarm tagging module 1630 can allow a user to subscribe to various places within the building (e.g., a particular zone, a particular conference room, etc.) and various building activities. For example, a user may indicate via a mobile device to alarm tagging module 1630 that they would like to subscribe, or subscribe another use, to a particular place such as a conference room. Whenever there is an alarm associated with the conference room, or there is a particular activity occurring, such as a meeting, the subscribed user may receive a notification from the building alarm management system 502 via their mobile device. In another example, a user could subscribe to particular types of building activities such as "special events." The subscribed user may receive notifications regarding any activities that occur in the building that are "special events." Special events may include social events, birthday parties, charity drives, etc.

Alarm Notifier Application Interfaces

Referring now to FIGS. 17-27, several alarm notifier user interfaces 1700-2700 which can be generated by an application such as the alarm notifier application 518 are shown, according to an exemplary embodiment. In some embodiments, the alarm notifier application 518 is a mobile application configured to run on mobile devices. For example, the alarm notifier application 518 can be a smartphone application configured to run on smartphones or other mobile device platforms (e.g. tablets, PDAs, laptops, etc.). In other embodiments, the alarm notifier application 518 can be a web application (i.e., an application configured to run in a web browser) or other type of application configured to run on mobile devices (e.g., smartphones, tablets, laptop computers, etc.) or non-mobile devices (e.g., desktop computers, client workstations, security terminals, etc.).

Figures 17, 18:
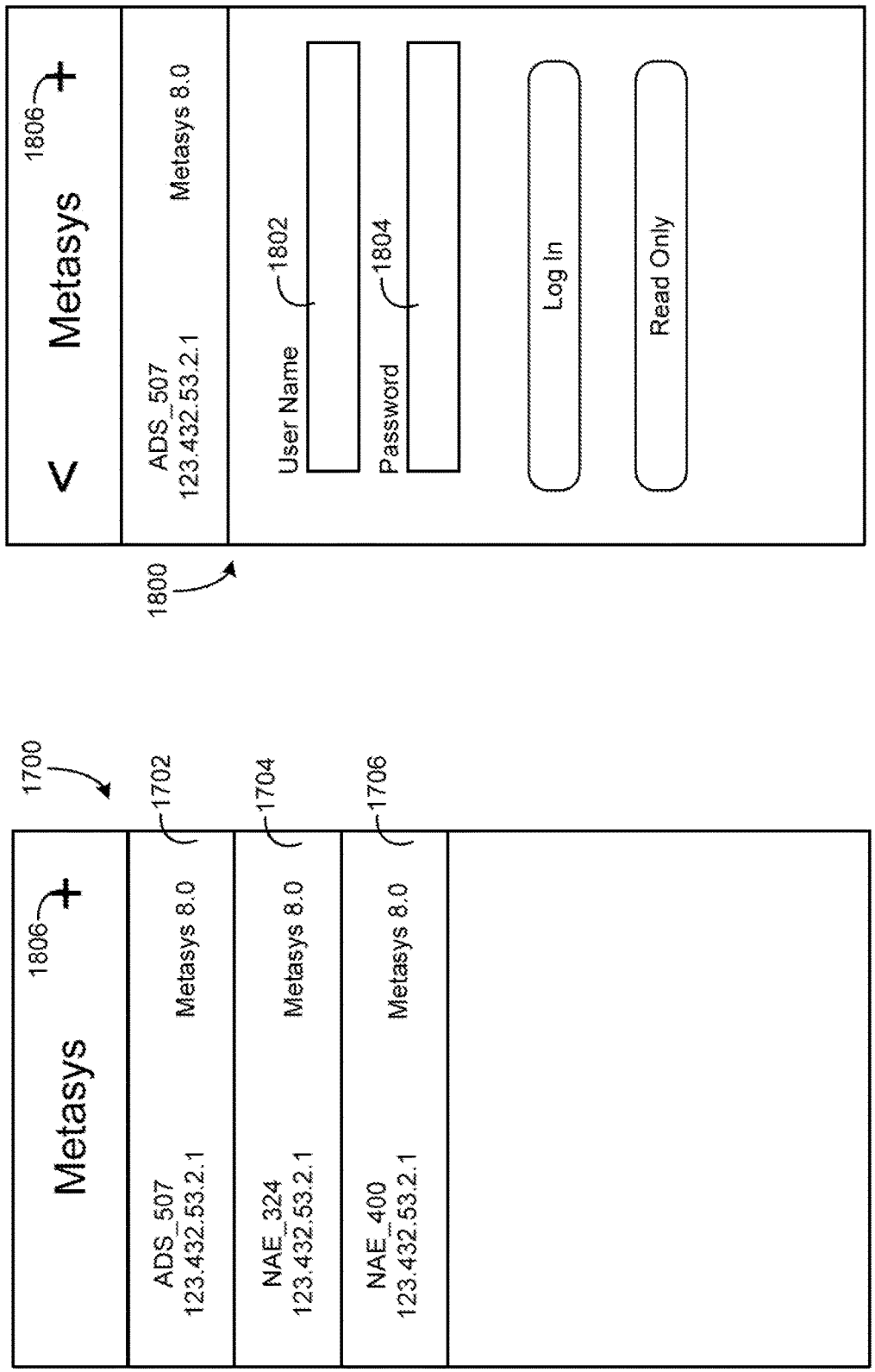
FIG. 17 is an image of a site selection interface which can be generated by an alarm notifier application running on a mobile device, according to an exemplary embodiment.
FIG. 18 is an image of a login interface which can be generated by the alarm notifier application, according to an exemplary embodiment.

FIG. 17 is a site selection interface 1700. In some embodiments, the site selection interface 1700 is displayed when the alarm notifier application 518 is first launched. The site selection interface 1700 allows a user select a particular site for which available alarms can be viewed. Selectable sites can include, for example, various alarm management systems (e.g., building alarm management system 502), building automation systems, network automation engines, or other systems or devices that can be monitored via the alarm notifier application 518. The site selection interface 1700 is shown to include the names of various sites that can be selected (e.g., "ADS_507," "NAE_324," "NAE_400," etc.) and the IP address of each site. Buttons 1702, 1704, and 1706 may allow a user to select from "ADS_507," "NAE_325," and "NAE_400" respectively. In some embodiments, the site selection interface includes an indication of the type of building automation system installed at the site (e.g., Metasys 8.0). A user can add additional sites to the list by selecting the "add site" icon 1806, shown as a plus in FIG. 17.

FIG. 18 is a login interface 1800. The login interface 1800 can be displayed in response to selecting a site via the site selection interface via one of buttons 1702, 1704, and 1706. The login interface 1800 may prompt a user to provide a username, password, or other login credentials via username input box 1802 and password input box 1804. The credentials provided by the user via the login interface 1800 can be used by a building alarm management system to identify the user and determine the user's access permissions. The building alarm management system described may be selected in site selection interface 1700, however, the building alarm management system is described herein as building alarm management system 502. The user's access permissions may define the set of alarms that the user can view as well as the types of actions the user can take with respect to various alarms. In some embodiments, the alarm notifier application 518 allows the user to select a site in "read only" mode, which may not require a password or login credentials. The read only mode may allow the user to view alarms for the site without allowing the user to make any changes or provide feedback to the building alarm management system 502.

Figures 19, 20:
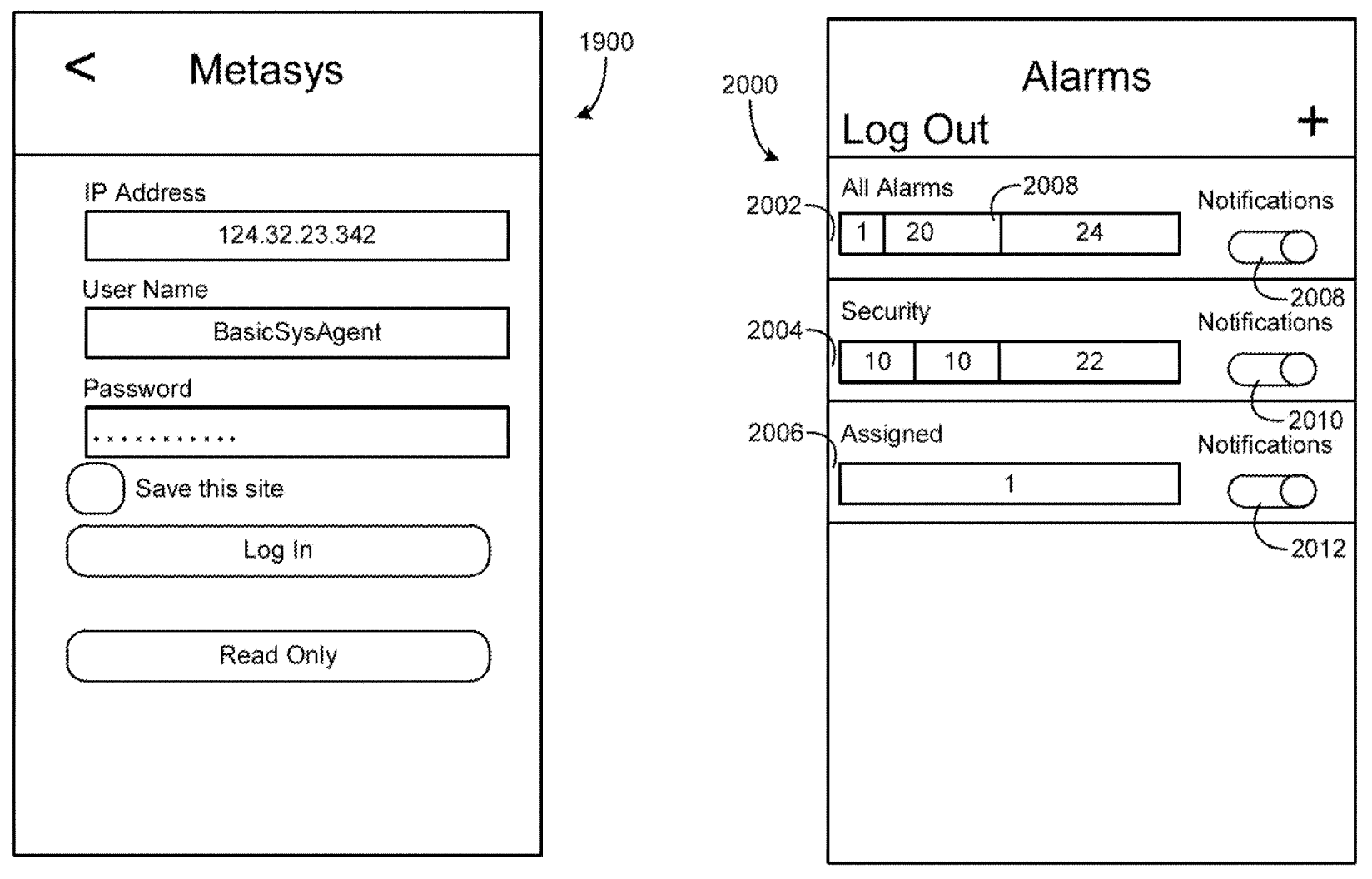

FIG. 19 is a site information interface 1900. The site information interface 1900 can be displayed in response to selecting the "add site" icon 1806 via the site selection interface 1900. The site information interface 1900 allows a user to enter a new site and provide information for the site. For example, the user can specify the site's IP address and can provide login information for use in logging in to the site. The site information interface allows a user to save the site and/or login information so that the site will appear in the site selection interface.

FIG. 20 is an alarm viewer interface 2000. The alarm viewer interface 2000 can be displayed in response to logging into a particular site via the login interface 1900 or the site information interface 1900. In some embodiments, the alarm viewer interface 2000 is available to a user in both administrator mode (i.e., when the user logs in with administrator credentials) and read only mode (i.e., when the user logs in without providing administrator credentials). The alarm viewer interface 2000 is shown to include a list of alarms for the selected site. The alarms can be arranged into various categories to facilitate presenting the alarm information to the user. For example, the alarms can be categorized by space, equipment type, alarm type, alarm status, timeframe, priority, or other attributes of the alarm. In some embodiments, the alarm categories can be customized or defined by the user (e.g., if the user logs in as an administrator).

In FIG. 20, the alarm categories are shown to include an "All Alarms" category 2002, a "Security" category 2004, and an "Assigned" category 2006. Within each category, the alarms can be further classified by other alarm attributes. For example, the "All Alarms" 2002 category is shown to include a graphic 2008 that classifies the alarms by type. The graphic 2008 indicates that one of the alarms represents offline equipment (shown as a bar with the number "1," could be a color black bar), twenty of the alarms are classified as warnings (shown as a bar with the number "20," could be a yellow colored bar), and twenty-four of the alarms are classified as alarms (shown as a bar with the number "24," could be a red colored bar). Similarly, the "Security" category 2004 is shown to include a graphic that classifies security alarms by type. The graphic indicates that ten of the alarms represent offline equipment (shown as a bar with the number "10"), ten of the alarms are classified as warnings (shown as a bar with the number "10"), and twenty-two of the alarms are classified as alarms (shown as are bar with the number "22"). The "Assigned" category 2006 indicates which of the alarms have been assigned to a user for resolution.

In some embodiments, the alarm viewer interface 2000 includes a selectable switch (i.e., selectable switches 2008-2012) that allows a user to enable or disable alarm notifications for each alarm category 2002-2006. Notifications can be enabled or disabled for each category separately to allow a user to specify which alarms should be sent to the user as alarm notifications. The building alarm management system 502 can store the user's alarm notification preferences to provide the user with alarm notifications only for only the selected alarm categories. Alternatively, the alarm notifier application 518 can selectively filter alarm notifications received from the building alarm management system 502 to provide alarm notifications for only the selected alarm categories. In some embodiments, the alarm notifications are received from the building alarm management system 502 as data messages (e.g., push notifications). In response to receiving an alarm notification, the alarm notifier application 518 can cause the user device to vibrate, emit a sound, or otherwise alert the user that an alarm notification has been received.

FIG. 21 is an alarm categories interface 2100. The alarm categories interface 2100 can be displayed in response to the user selecting the "new alarm category" icon (shown as a plus icon) in the alarm viewer interface. In some embodiments, the alarm categories interface 2100 is available only when the user logs in using administrator credentials. The alarm categories interface 2100 can allow a user to define new alarm categories which can be displayed via the alarm viewer interface 2000. Alarm categories can act as filters to narrow the set of all alarms to only those which fit the criteria specified in the alarm category. For example, an alarm category can filter alarms by space, equipment, alarm type, alarm status, timeframe, priority, or other alarm attributes.

FIG. 22 is an authorization interface 2200. The authorization interface 2200 can be displayed when a new alarm category is created. The authorization interface 2200 allows a user to specify the users or groups to which the alarm category is visible. For example, the authorization interface 2200 can allow the alarm category to be displayed only for a particular user or users, a group of users (e.g., administrators only), or for all users (e.g., read only). The users associated with the alarm category can then view alarms for the alarm category via the alarm viewer interface.

FIG. 23 is an alarm information interface 2300. The alarm information interface 2300 can be displayed in response to selecting an alarm category via the alarm viewer interface 2000. For example, the interface 2300 shown in FIG. 23 can be displayed in response to a user selecting the "All Alarms" category 2202 in FIG. 20. The alarm information interface 2300 is shown to include the bar graphic (e.g., a colored bar graphic) providing an overview of the alarms in the selected category. Below the colored bar, the alarm information interface provides detailed information for the alarms in the selected alarm category.

In some embodiments, the alarm information interface 2300 lists each alarm along with summary information for the alarm. For example, the alarm interface can include an indication of the alarm status (e.g., a red icon indicating an "alarm" status, a yellow icon indicating a "warning" status, and a black icon indicating an "equipment offline" status), the system or device associated with the alarm (e.g., VAV-2-10, Chilled Water Plant, etc.), the variable associated with the alarm (e.g., zone temperature (ZN-T), discharge air temperature (DA-T), etc.), the reason for the alarm (e.g., "High Alarm," "Zone Temperature Out of Limits," etc.), the duration of the alarm (e.g., 5 minutes, 10 minutes, 2 days, etc.), and/or other information that describes the alarm.

In some embodiments, the alarm information interface 2300 enables a user to easily assign the alarm and/or acknowledge or discard the alarm. For example, the user can swipe an alarm in one direction (e.g., swipe left) to assign the alarm to a particular user (shown in FIG. 27). Similarly, the user can swipe an alarm in another direction (swipe right) to acknowledge or discard the alarm without assigning to a user. The alarm information interface 2300 also allows a user to view detailed information about the alarm. For example, a user can select an alarm by tapping or clicking the alarm summary information in the alarm information interface. Selecting an alarm via the alarm information interface 2300 may cause the application to display the alarm details interface (shown in FIG. 25).

FIG. 24 is an alarm filter interface 2400. The alarm filter interface 2400 can be displayed in response to a user selecting the "Filter" icon 2302 in the alarm information interface 2300. The filter interface 2400 allows a user to filer the list of alarms displayed in the alarm information interface by alarm type, alarm status, priority, time frame, space, equipment, and/or other alarm attributes. After a filter is defined, the list of alarms can be reduced to only those alarms that satisfy the filter criteria. This allows a user to view only the alarms that fit the filter when browsing the alarms via the alarm information interface.

Figures 25, 26:
FIG. 25 is an image of an alarm details interface which can be generated by the alarm notifier application, according to an exemplary embodiment.
FIG. 26 is an image of an assigned alarms interface which can be generated by the alarm notifier application, according to an exemplary embodiment.

FIG. 25 is an alarm details interface 2500. The alarm details interface 2500 can be displayed in response to a user selecting one of alarms 2304-2316 via the alarm information interface 2300. The alarm details interface 2500 is shown to include detailed information for the selected alarm. Alarm details can include, for example, the alarm name, the alarm priority, the alarm type, the equipment associated with the alarm, a trigger value for the alarm, a time at which the alarm occurred, text associated with the alarm (e.g., an explanation for the alarm), alarm annotations (e.g., text entered by a user), a current value of a variable associated with the alarm, a history of previous occurrences of the alarm, and/or other details associated with the alarm. The alarm details interface 2500 is shown to include an "Actions" button 2502 which allows a user to take action with respect to the selected alarm.

In some embodiments, the alarm details interface 2500 includes a link to a user interface for the building automation system. For example, the equipment "VRF-1" is shown as a selectable link. Selecting the link can cause the alarm notifier application 518 to display a separate interface (e.g., a Metasys UI) for monitoring and controlling the BAS. The BAS interface can be displayed within the alarm notifier application 518 or via a separate application configured to interact with the BAS. Advantageously, providing the link to the BAS user interface within the alarm notifier application 518 allows for lengthy URLs to be included, which may not be possible using other notification delivery techniques that have a strict character limit (e.g. SMS text messaging). An example of a BAS user interface which can be displayed in response to selecting a link in the alarm notifier application 518 is described in detail in U.S. Patent Application No. 62/286,273 titled "Building Energy Management System," the entire disclosure of which is incorporated by reference herein.

FIG. 26 is an assigned alarms interface 2600. In some embodiments, the assigned alarms interface 2600 is displayed in response to selecting the "Assigned" category 2006 via the alarm viewer interface 2000. The assigned alarm interface 2600 includes all of the alarms that have been assigned to a user. For example, an alarm can be added to the assigned alarms interface by swiping the alarm in a particular direction (e.g., swipe left) in the alarm information interface. The assigned alarm interface includes summary information for the assigned alarms, which may be the same or similar to the summary information displayed via the alarm information interface. Assigned alarms can also be filtered using any of the filter criteria previously described.

Figure 27:
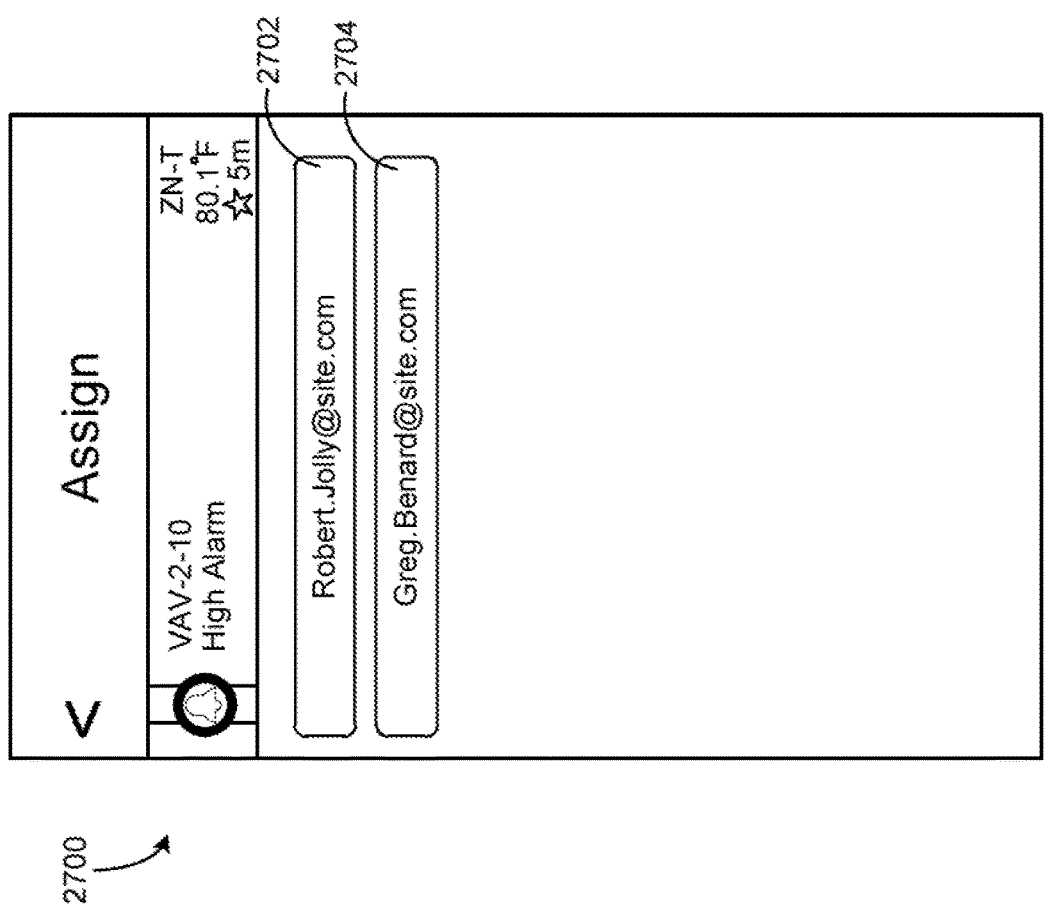
FIG. 27 is an image of an alarm assignment interface which can be generated by the alarm notifier application, according to an exemplary embodiment.

FIG. 27 is an alarm assignment interface 2700. The alarm assignment interface 2700 can be displayed in response to a user input indicating that the user wishes to assign the alarm to a user or group. For example, the alarm assignment interface can be displayed in response to the user swiping an alarm (e.g., one of alarms 2304-2316) in a particular direction (e.g., swipe left) in the alarm information interface 2300. The alarm assignment interface is shown to include summary information for the alarm and selectable buttons 2702 and 2704 identifying particular users or groups to which the alarm can be assigned. A user can select one of the selectable buttons 2702 and 2704 to assign the alarms to the specified user or group for further action.

Equipment Finder Application Interfaces

Referring now to FIGS. 28-36 several equipment finder user interfaces which can be generated by the mobile device are shown, according to an exemplary embodiment. In some embodiments, these interfaces are generated by the alarm notifier application 518 running on the mobile device. In other embodiments, the interfaces can be generated by a separate equipment finder application 520. In some embodiments, the equipment finder application 520 is a component of the alarm notifier application 518. For example, both the equipment finder application 520 and the alarm notifier application 518 can be combined into a single application that performs the function of both applications.

Figure 29:
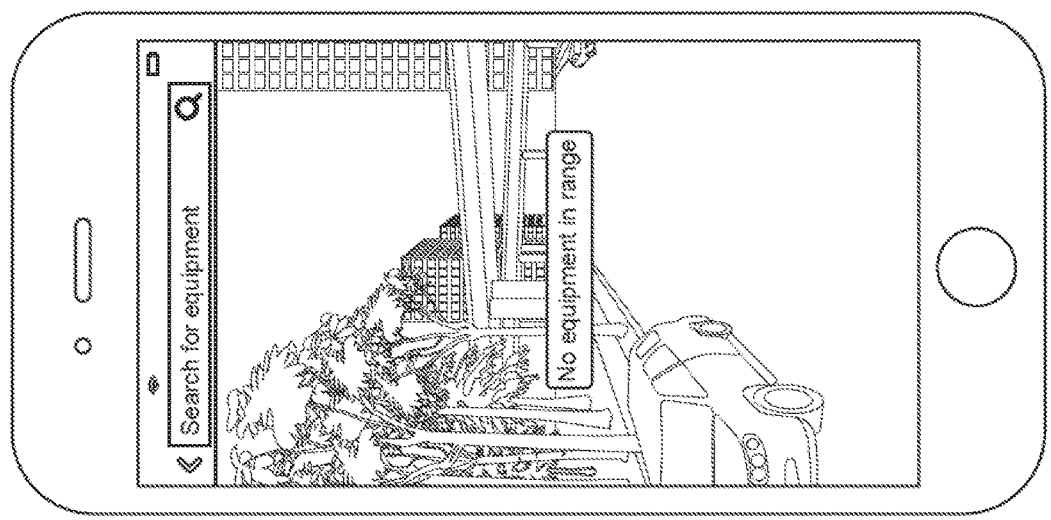
FIGS. 28-29 are images of a start screen for an application configured to display the locations of building equipment on a mobile device, according to an exemplary embodiment.
Figure 28:
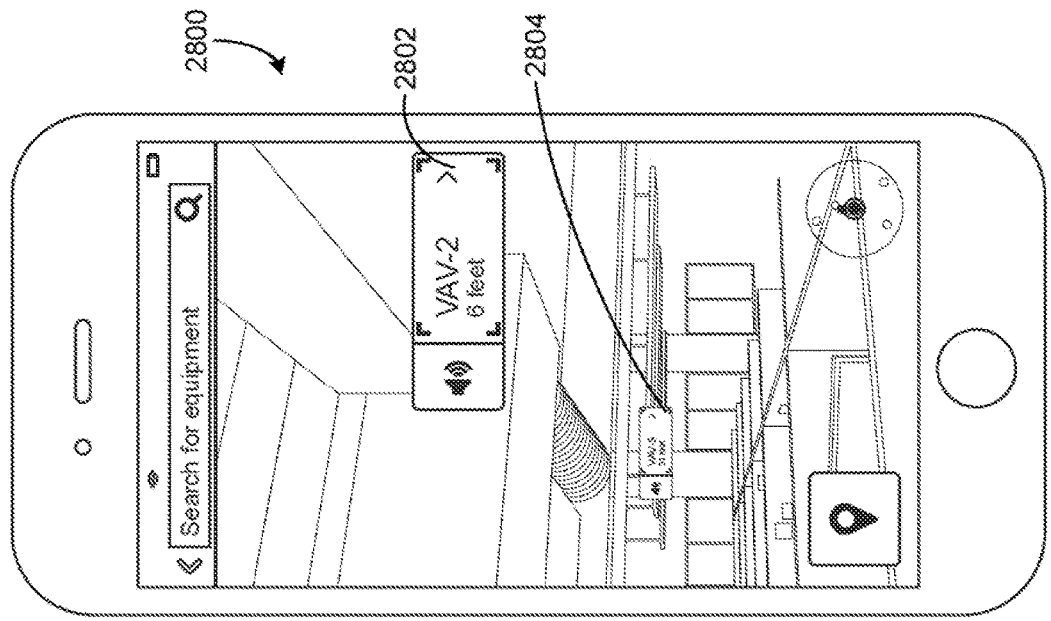

Referring particularly to FIGS. 28-29, a start screen for the equipment finder application 520 is shown, according to an exemplary embodiment. In some embodiments, the application initially opens in augmented reality mode, in which the mobile device displays an augmented reality display 2800. The augmented reality display 2800 may include a camera-derived view of the building space within which the mobile device is located (e.g., using a camera integrated with the mobile device). If any BAS devices are within range of the mobile device, the augmented reality display may include an indication of where the BAS devices are located within the building space. For example, FIG. 28 shows a first VAV ("VAV-2") 2802 located within one air supply duct and a second VAV ("VAV-3") 2804 located within another air supply duct.

In some embodiments, the augmented reality display 2800 includes distances between the mobile device and the BAS devices. In some embodiments, the augmented reality display includes a sound icon associated with each BAS device. Selecting the sound icon may cause the associated BAS device to produce a sound or other indication to further guide the user toward the BAS device. If no BAS devices are within range of the mobile device, the augmented reality display 2800 may present a message that no equipment is within range (as shown in FIG. 29).

Referring now to FIGS. 30-31, an equipment searching interface 3000 is shown, according to an exemplary embodiment. The equipment searching interface 3000 may include a search field 3002 that allows a user to specify a device name, type, or other device-delated parameter. For example, as shown in FIG. 30, a user can enter the text "VAV-1" into the search field 3002 to search for all BAS devices that have the text string "VAV-1" in their device names. In some embodiments, the searching interface 3000 allows a user to search by device type (e.g., chiller, VAV, fan, etc.) or any other attribute of the BAS devices. In some embodiments, the equipment searching interface 3000 allows the user to filter the set of searchable equipment by location (e.g., by building, by floor, by room, etc.) and/or by equipment type, as shown in FIG. 31. The equipment searching interface 3000 may communicate with the device locating system (e.g., building alarm management system 502) and/or the BAS controller to obtain a list of BAS devices that can be searched. The user can select a particular BAS device or set of BAS devices via the equipment searching interface.

Figure 33:
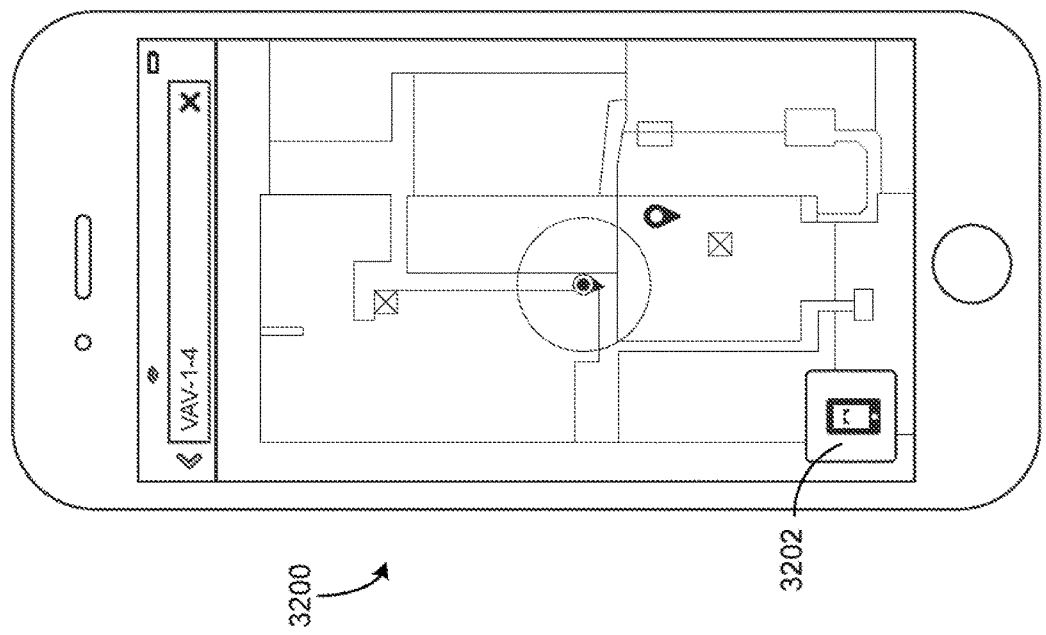
FIGS. 32-33 are images of a map display interface which may be presented via the mobile device, according to an exemplary embodiment.
Figure 32:
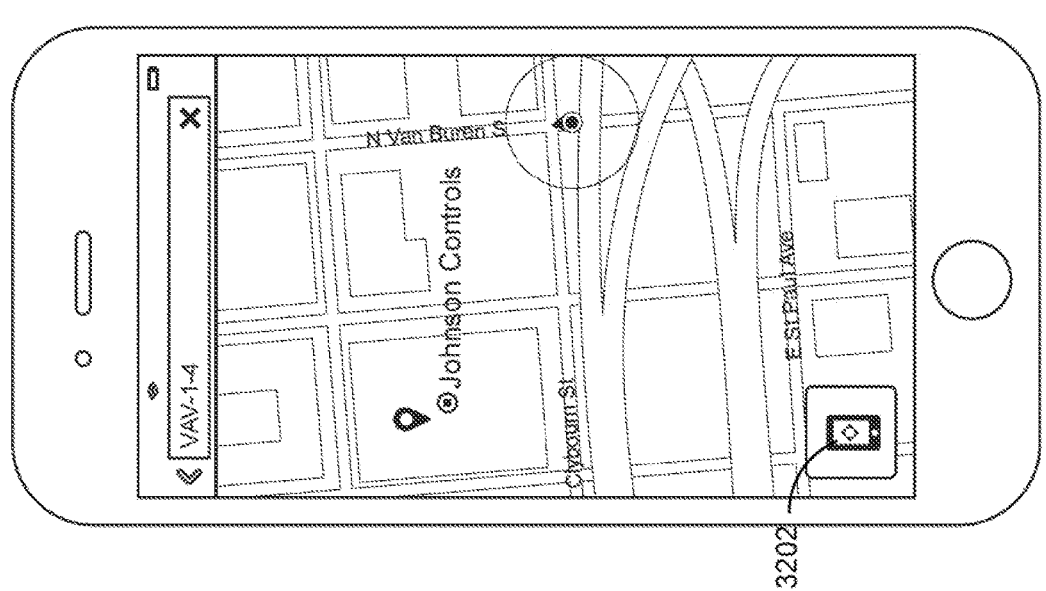

Referring now to FIGS. 32-33, a map display interface 3200 is shown, according to an exemplary embodiment. The map display interface 3200 may be presented in response to a user selecting a BAS device via the equipment searching interface 3000. The map display interface 3200 may display the location of the selected BAS device and the location of the mobile device on a street map (as shown in FIG. 32) and/or a building floorplan (as shown in FIG. 33). The street map may be displayed if the mobile device is not located in the same building as the selected BAS device. The floorplan may be displayed if the mobile device is located in the same building and/or on the same floor as the selected BAS device. The map display interface may obtain building floorplans from the device locating system and/or the BAS controller. The street maps may be obtained from any of a variety of sources (e.g., Google Maps, etc.).

The map display interface 3200 is shown to include an augmented reality button 3202 (i.e., the smaller box in the lower left corner of the display screen). When selected, the augmented reality button 3202 may cause the user interface to switch to the augmented reality display 2800. The augmented reality button 3202 may not be selectable if the mobile device is not in the same room as the BAS device (as shown in FIG. 32). When the mobile device is moved within a predetermined distance of the BAS device (e.g., in the same room), the augmented reality button 3202 may become selectable (as shown in FIG. 33).

Figure 34:
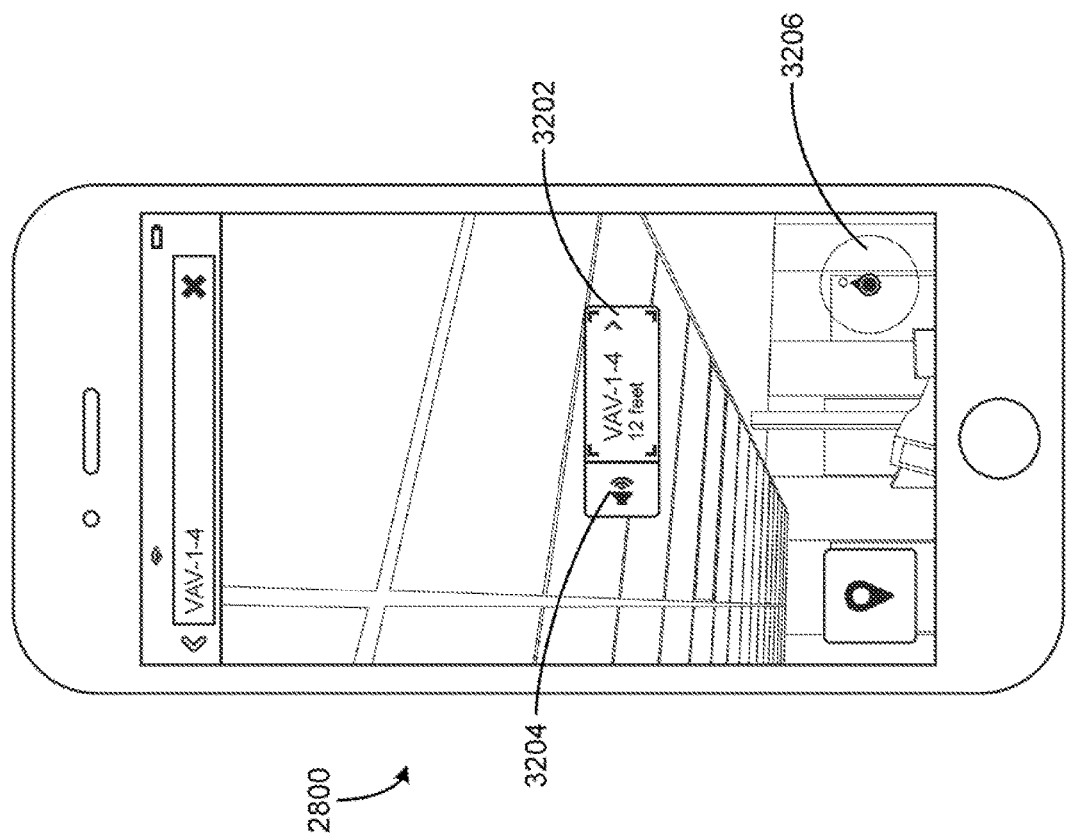
FIG. 34 is an image of an augmented reality interface which may be presented via the mobile device, according to an exemplary embodiment.

Referring now to FIG. 34, another image of the augmented reality interface 2800 is shown, according to an exemplary embodiment. The augmented reality interface 2800 include a camera-derived view of the building space within which the mobile device is located (e.g., using a camera integrated with the mobile device). If any BAS devices are within range of the mobile device, the augmented reality interface 2800 may include an indication 3402 of where the BAS devices are located within the building space. For example, FIG. 34 shows a first VAV ("VAV-1-4") located within the ceiling of the building space.

In some embodiments, the augmented reality interface 2800 includes a distance between the mobile device and the BAS device. In some embodiments, the augmented reality interface 2800 includes a sound icon 3204 associated with the BAS device. Selecting the sound icon 3204 may cause the BAS device to produce a sound or other indication to further guide the user toward the BAS device. In some embodiments, the augmented reality interface 2800 includes an interface element 3206 (e.g., in the bottom right corner of the display) indicating the relative locations of nearby BAS devices, even of the BAS devices are not displayed in the camera-derived view.

Figure 36:
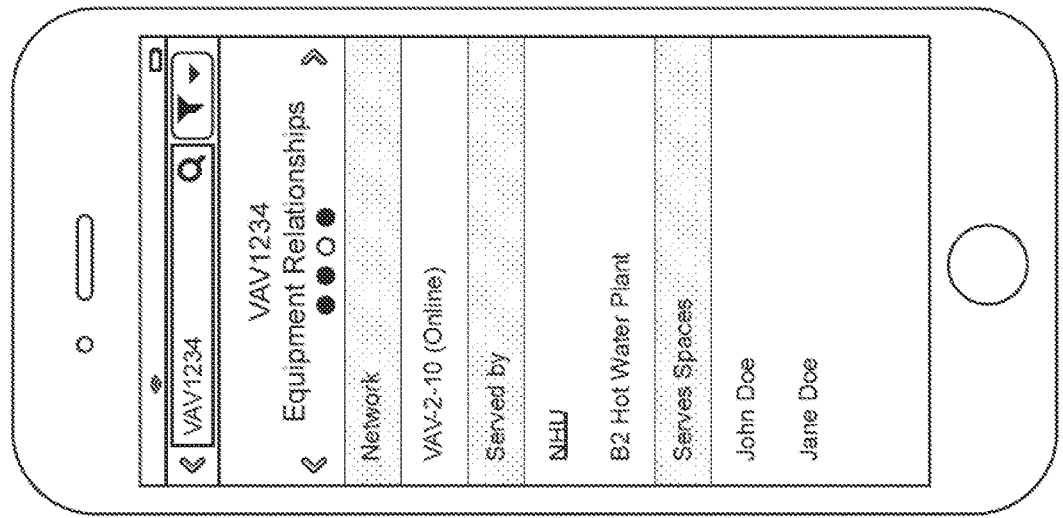
FIGS. 35-36 are images of a monitoring and control interface which may be presented via the mobile device, according to an exemplary embodiment.
Figure 35:
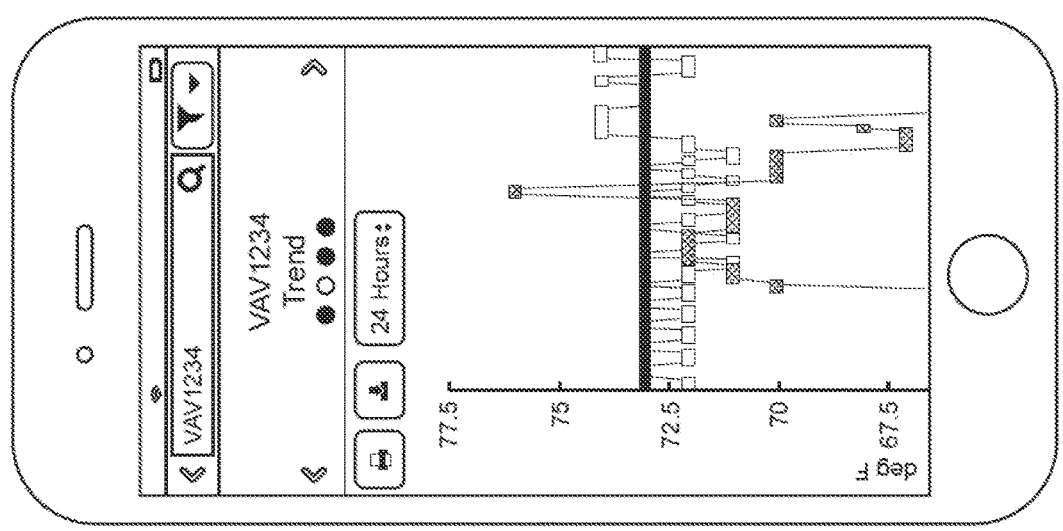

Referring now to FIGS. 35-36, a monitoring and control interface 3500 is shown, according to an exemplary embodiment. The monitoring and control interface 3500 may be configured to present data associated with the BAS device, perform diagnostics, send commands to the BAS device, and/or perform other monitoring/control functions. In some embodiments, the monitoring and control interface is configured to perform some or all of the monitoring and control operations described in U.S. Patent Application No. 62/156, 854 titled "Systems and Methods for Locating Building Equipment," the entire disclosure of which is incorporated by reference herein. The functionality available via the monitoring and control interface may be a function of the type of BAS device and/or the control options available for the BAS device.

Interfaces for Work Shift Logs

Figure 37:
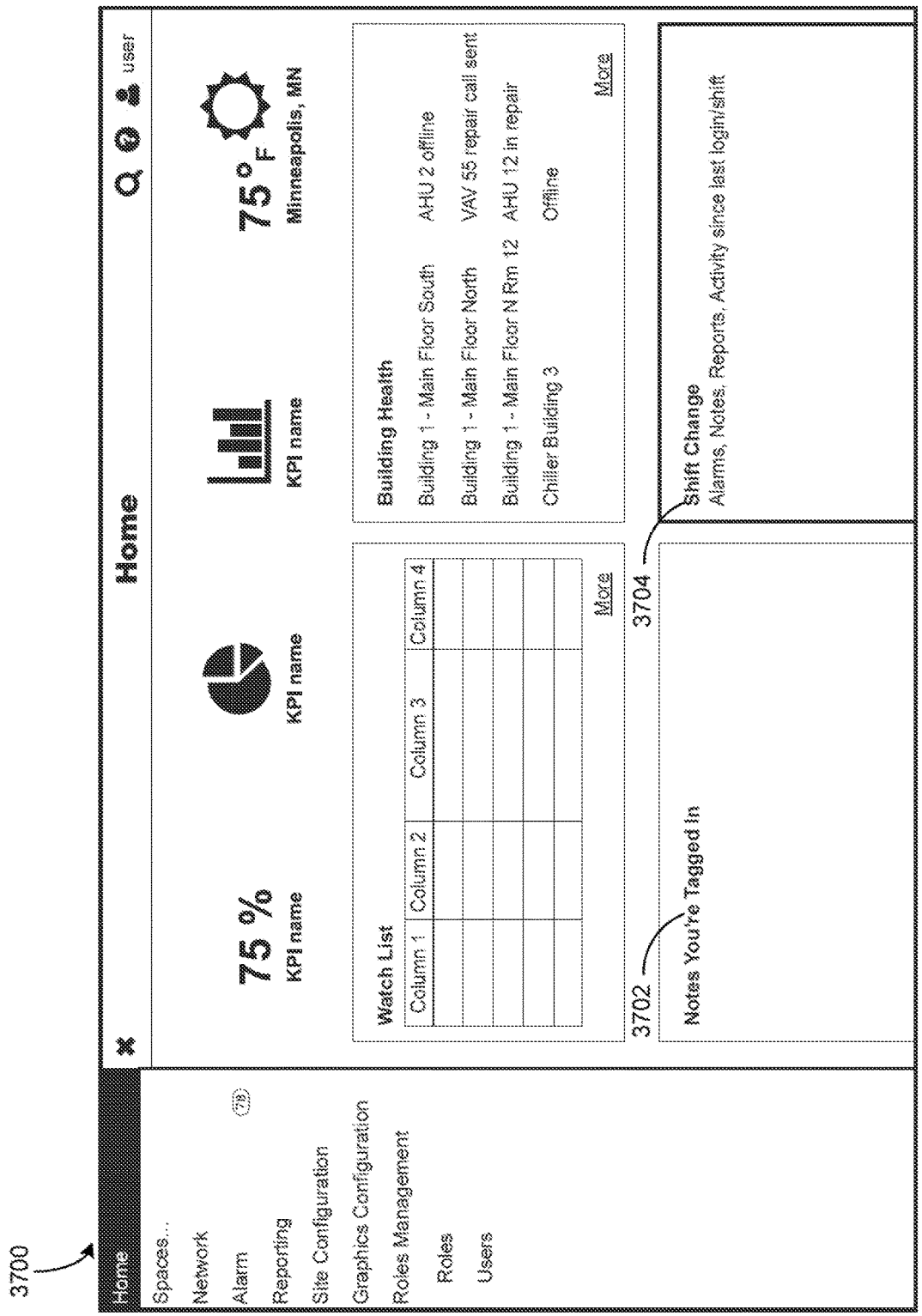
FIG. 37 is a user interface that includes service notes and alarms that occur outside of a user's working hours, according to an exemplary embodiment.
Figure 38:
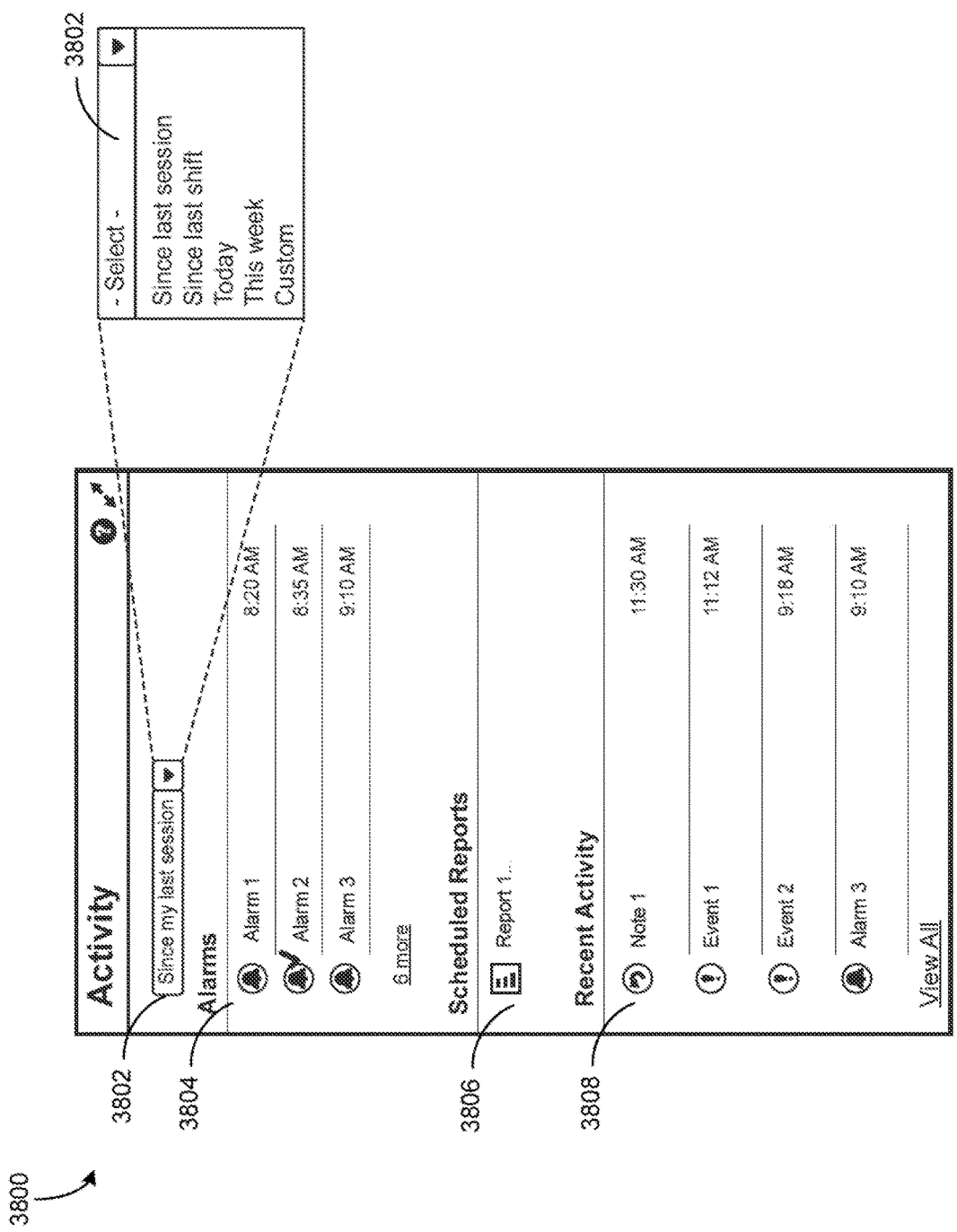
FIG. 38 is a user interface that sorts alarms based on working hours, sessions, and time, according to an exemplary embodiment.

Referring now to FIGS. 37-38, interfaces for a building management system are shown, according to exemplary embodiments. The interfaces shown in FIGS. 37-38 may be interfaces for building alarm management system 502 or another management system described herein. The interfaces of FIGS. 37-38 may be a display interface for client devices 514 and/or mobile devices 516. In some embodiments, the interfaces are interfaces for the alarm notifier application 518 and/or the equipment finder application 520.

Referring now to FIG. 37, a system interface 3700 for a building management system is shown, according to an exemplary embodiment. The system interface 3700 information regarding information that is occurring in a building (e.g., equipment faults, performance metrics, outdoor weather conditions, etc.). The system interface 3700 is shown to include a notes interface 3702 and a shift change interface 3704. The notes interface 3702 may display information pertaining to events that have occurred in a building that a particular user has been tagged in. For example, one technician may replace a filter on a piece of BMS equipment and tag a second technician in a note entered into the system interface 3700 that indicates that the filter has been changed. This may allow the second technician to have knowledge of changes to the building and the equipment inside the building even when the technician is not at the building (e.g., it is not his/her shift).

The notes of the notes interface 3702 may act as a shift log for users to enter information regarding their work shift. In some embodiments, when a fault for the building is cleared, the first technician may tag the second technician in the fault so that the second technician knows that a fault has occurred and has been fixed. In some embodiments, when a user is tagged in a note, the user may receive a message (e.g., via the alarm notifier application 518, via the equipment finder application 520, via an SMS message, via a MMS message, via an email, etc.).

The shift change interface 3704 may display information for a user based on shift information. The shift change interface 3704 may be a widget of system interface 3700. In some embodiments, the shift change interface 3704 is a full page interface of the system interface 3700. In various embodiments, then the shift change interface 3704 appears as a widget, interacting with the widget causes user to view the shift change interface 3704 as a full page interface. In this regard, the application may receive information, regarding a shift schedule. In some embodiments, the roles database 512 stores information pertaining to shifts for building employees that the application may be able to retrieve and/or the application may use to determine what shifts each user is on. The shift change interface 3704 may display any building information (e.g., fault information, historical information, etc.) of anything that has occurred in the building since a building employee has been on their shift. In this regard, whenever a user logs into the application at the beginning of their shift, they can look at the shift change interface 3704 to determine what has happened in the building since their last work shift.

In some embodiments, the shift change interface 3704 displays alarms in a particular order in a list. For example, the alarms may displayed starting (at the top of the list) from when the shift of a particular logged in user ended. The shift change interface 3704 may then chronologically order the alarms to the most recent alarm occurring alarm before the user started their shift (at the bottom of the list).

Referring now to FIG. 38, an activity interface 3800 is shown, according to an exemplary embodiment. In some embodiments, the activity interface 3800 is part of another interface, for example, the activity interface 3800 may be the shift change interface 3704. In other embodiments, the activity interface 3800 is an interface for a separate application e.g., a mobile application. The activity interface 3800 is shown to include an alarms interface 3804, a scheduled reports interface 3806, and a recent activity interface 3808. The alarms interface 3804 may be various alarms that have occurred in the building (e.g., alarms of building equipment) and recent activity interface 3804 may be a live feed of various alarms in the building.

The items listed in the alarms interface 3804, the scheduled reports interface 3806, and the recent activity interface 3808 may be filtered based on a filter option of a filter drop down 3802. The filter drop down 3802 may allow a user to select a filter option to filter information in the alarms interface 3804, the scheduled reports interface 3806, and/or the recent activity interface 3808. The filter options may be "since last session," this may correspond to the alarms which have occurred since a particular user last logged into the application. The filter options may further include "since last shift" which may be a filter alarm to filter based on alarms that have occurred since the last shift of a user. The filter options of the filter drop down 3802 may also include a "today" selection, which filters by alarms that have occurred on the same day that the user is viewing the alarms in the application. The filter options may further include a "this week" which filters by the current week and a "custom" which allows a user to create a custom filter setting that includes filter parameters input by the user.

The scheduled reports interface 3806 may display information pertaining to any scheduled activities that have and/or will occur in the building. The recent activity interface 3806 may include information of events that will occur in the building such as a conference at a particular conference room of the building, a scheduled firmware update for controllers of the building, a scheduled operating change for building equipment from a heating mode to a cooling mode in the spring, etc. In some embodiments, the scheduled reports include building reports that are generated daily, monthly, and/or yearly. The scheduled reports may include information pertaining to a building and/or the equipment located in the building.

The recent activity interface 3800 is shown to include all system events and/or user interactions. The recent activity interface 3800 may include all system alarms that occur outside of the working hours of the user and/or alarms that have occurred within a predefined amount of time. Further, any comments or notes that have been entered into the system outside of the working hours of the user and/or have been entered recently may be included. In some embodiments, only comments and notes that tag the user are displayed in recent activity interface 3808. In some embodiments, the activity that is displayed in recent activity interface 3808 is activity that has occurred within a predefined amount of time.

The recent activity interface 3808 may display information pertaining to all events, commands send to building equipment by a user, and/or notes. These events may be system events that can be filtered by the filter options of the filter drop down 3802. In some embodiments, the events include various alarms that have occurred, a note that a user has entered into the building alarm management system 502, and/or any changes to building equipment that have been made by a user. The system events interface 3808 may be configured to display only the most recently occurring system events, by pressing the view all button of the system events interface 3808, a complete list of all system events may be displayed to a user.

Methods for the Building Alarm Management System

Referring now to FIG. 39, a flow diagram of a process 3900 for sending alarms to a mobile device is shown, according to an exemplary embodiment. The building alarm management system 502 can be configured to perform the process 3900. Further, any of the computing devices described herein can be configured to perform the process 3900. In step 3902, the building alarm management system 502 can receive one or more alarms from building equipment and/or other building systems. In some embodiments, the alarms received by the building alarm management system 502 is received from the fire detection & alarm system 504, the access control system 506, and the building automation system 508. The alarms may be received from and/or generated by the detectors 522, the readers 517, the cameras 520, and/or the building subsystems 524. The building subsystems 524 may include HVAC equipment (e.g., boiler 104, VAVs 116, chiller 102, AHU 106, etc.)

In step 3904, the building alarm management system 502 can receive location information for the building equipment and one or more mobile devices. In some embodiments, the location information is the location of the one or more mobile devices or the building equipment as determined by the one or more mobile devices or the building equipment. In some embodiments, the location information is the locations of the building equipment and/or the one or more mobile devices as determined by the access control system 506. In various embodiments, the location information includes altitude data and/or GPS data determined by GPS devices or altimeters of the building equipment or the one or more mobile devices. Further, the location information may include signal strengths to one or more wireless emitters/receivers. In some embodiments, the building alarm management system 502 can be configured to use the location information to determine the location of the building equipment and the one or more mobile devices. Determining the location of the building equipment and the one or more mobile devices is further described in FIGS. 6-16.

In step 3906, the building alarm management system 502 can retrieve role information for one or more users that are associated with the one or more mobile devices. The role information may be information that is stored in a database, e.g., the roles database 512. The role information may indicate and/or include one or more roles for one or more users. In some embodiments, the role information is stored by the building alarm management system 502.

In step 3908, the building alarm management system 502 can send the one or more alarms received at step 3902 to the one or more mobile devices based on the role information retrieved in step 3906 and the location information of the one or more mobile devices and the building equipment determined in step 3904. In some embodiments, the building alarm management system 502 can determine where a user associated with the mobile device is located and cause the mobile device to display information associated with equipment that is located nearby. In various embodiments, only certain alarms are displayed to the user dependent on the role of a user. For example, a user that is a security guard may receive certain alarms while a user that is a building maintenance individual may receive other alarms.

In step 3910, the building alarm management system 502 can control environmental conditions of various zones based on one or more users being in the zones and preferred environmental settings of the one or more users. In some embodiments, the location information is the same as the location information as described in step 3904.

The building alarm management system 502 may store information associated with preferred environmental conditions of a user (e.g., preferred temperature setpoint, preferred airflow, etc.). When a user is detected in a zone, the building alarm management system 502 can cause the equipment in the zone to be operated to the preferred environmental conditions. In some embodiments, the building alarm management system 502 communications directly with the equipment or causes another system to control the building equipment. In some embodiments, when there are multiple users in the zone, the building alarm management system 502 can determine which user in the zone has the highest permission level and operate at the preferred environmental conditions of the user with the highest permission level.

Referring now to FIG. 40, a flow diagram of a process 4000 is shown for sending a mobile device of a user service notes and alarm information based on the user's working hours, according to an exemplary embodiment. The building alarm management system 502 can be configured to perform the process 4000. Further, any of the computing devices described herein can be configured to perform the process 4000.

In step 4002, the building alarm management system 502 can receive an indicator associating a user with a particular alarm from a mobile device. In some embodiments, a user may want another user to receive the alarm whenever the alarm occurs. In this regard, the user, via their mobile device, may indicate that another user should receive the alarm. In step 4004, the building alarm management system 502 can send the particular alarm to the indicated user whenever the alarm occurs. The building alarm management system 502 may send the alarm to the mobile device of the indicated user.

In step 4006, a user may enter service notes into the building alarm management system 502 and tag a user in the service note. The building alarm management system 502 may receive the service note from a mobile device. The building alarm management system 502 may identify the tagged user via the name of the user or a handle of the user. In step 4008, the building alarm management system 502 can send the service note to a mobile device of the tagged user. In some embodiments, the building alarm management system 502 sends the service notes to the mobile device of the tagged user when the user logs into an application on their mobile device (e.g., the alarm notifier application 518).

In step 4010, the building alarm management system 502 can retrieve work shift information for a user and record alarms that occur outside of the working hours of the user as indicated by the work shift hours. The work shift hours may identify days and times that a user is working. The work shift hours may be a work calendar for a user. The building alarm management system 502 can record any alarms that occur outside of the working hours for the user. In step 4012, the building alarm management system can send any alarms that it records to the mobile device of the user. In some embodiments, the building alarm management system 502 only records certain alarms that have a high importance level. In some embodiments, the building alarm management system 502 records the alarms based on the role of the user, for example, if the user is a security guard the building alarm management system 502 can only record alarms that are associated with security while for a building maintenance individual the building alarm management system 502 can only record alarms that are related to building equipment malfunctioning.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building alarm management system for a building, the building alarm management system comprising a processing circuit configured to:
   receive one or more alarms from building equipment of the building;
   receive location information for the building equipment located in the building and one or more mobile devices associated with one or more users located in the building;
   retrieve role information comprising roles associated with the one or more users;
   send the one or more alarms to the one or more mobile devices based on the roles associated with the one or more users and locations of the one or more mobile devices and the building equipment;
   store the location information over time, wherein the stored location information indicates a plurality of locations that one of the one or more mobile devices has been located in the building over time; and
   determine a trajectory for the one of the one or more mobile devices based on the stored location information, the trajectory comprising a future location of the one or more mobile devices.

2. The system of claim 1, wherein the processing circuit of the alarm management system is configured to:
   automatically adjust environmental conditions of a zone of the building based on preferred environmental setpoints of one of the one or more users in response to determining, based on the location information, that the one of the one or more users is in the zone of the building; and
   automatically adjust the environmental conditions of the zone of the building based on preferred environmental setpoints of a user with a highest permission ranking of all users in the zone in response to determining, based on the location information, that more than one of the one or more users are located in the zone of the building.

3. The system of claim 1, wherein the roles comprise a security guard role, a maintenance worker role, and a special skills role;
   wherein the processing circuit of the building alarm management system is configured to:
   send a set of the one or more alarms that are associated with the security guard role to mobile devices associated with users that are associated with the security guard role;
   send a set of the one or more alarms that are associated with the maintenance worker role to mobile devices associated with users that are associated with the maintenance worker role; and
   send a set of the one or more alarms that are associated with the special skills role to mobile devices associated with users that are associated with the special skills role.

4. The system of claim 1, wherein the processing circuit of the building alarm management system is configured to:
   receive an indicator from one or more of the users via one or more of the mobile devices that associates the one of the one or more users with a particular alarm of the alarms; and
   send an alarm notification to a mobile device associated with the associated user in response to determining that the particular alarm has occurred.

5. The system of claim 1, wherein the processing circuit of the building alarm management system is configured to:
   receive a service note from one of the one or more mobile devices, wherein the service note comprises a user tag of one of the one or more users; and
   send the service note to a mobile device associated with a tagged user.

6. The system of claim 1, wherein the processing circuit of the building alarm management system is configured to:
   retrieve work shift information for the one or more users, wherein the work shift information indicates days and times that the one or more users work in the building;
   record one or more alarms for one of the one or more users, wherein the recorded one or more alarms are alarms that occur outside of a work shift of the one user; and
   send the recorded one or more alarms associated with the one of the one or more users to a mobile device associated with the one of the one or more users.

7. The system of claim 1, wherein the processing circuit of the building alarm management system is configured to:
   predict an area of the building that the one of the one or more mobile devices will be located based on the determined trajectory; and
   send information associated with the predicted area of the building to the one of the one or more mobile devices before the one of the one or more mobile device enters the predicted area.

8. The system of claim 1, wherein the processing circuit of the building alarm management system is configured to:
   receive wireless signal strengths from a plurality of wireless modules configured to emit and receive wireless signals, wherein the signal strengths are signal strengths of wireless connections between the plurality of wireless modules and the building equipment and the one or more mobile devices; and determine the locations of the building equipment and the one or more mobile devices within the building based on the signal strengths.

9. The system of claim 1, wherein the building equipment and the one or more mobile devices each comprises a GPS device and an altimeter, wherein the location information received by the processing circuit of the building alarm management system received from the building equipment and the one or more mobile devices and is determined by the building equipment and the one or more mobile devices based on the GPS devices and the altimeters.

10. The system of claim 1, wherein the location information received by the processing circuit of the building alarm management system is sent to the building alarm management system by an access control system;
wherein the access control system is configured to determine the locations for the building equipment and the one or more mobile devices based on at least one of:
access data from one or more card readers of the building that the one or more users can interact with via one or more access cards associated with each of the one or more users; and
video data from one or more cameras located in the building that are configured to record the video data, wherein the video data comprises images of the one or more users.

11. The system of claim 1, further comprising a database separate from the one or more mobile devices and configured to store the trajectory;
wherein the processing circuit of the building alarm management system is configured to determine the trajectory by retrieving the trajectory from the database.

12. The system of claim 1, wherein the processing circuit of the building alarm management system is configured to:
compare the location information for the building equipment to the future location; and
determine that the building equipment is in an area of the building associated with the future location.

13. The system of claim 12, wherein the processing circuit of the building alarm management system is configured to send a first alarm of the one or more alarms to the one of the one or more mobile devices, the first alarm associated with the building equipment that is in the area of the building associated with the future location.

14. The system of claim 13, wherein the processing circuit of the building alarm management system is configured to send the first alarm of the one or more alarms to the one of the one or more mobile devices when the user is not in the area of the building associated with the future location.

15. The system of claim 1, wherein the stored location information further comprises a location that the one of the one or more mobile devices is located in the building.

16. The system of claim 1, wherein receiving the location information for the one or more mobile devices associated with the one or more users comprises:
receiving a first user location of a first mobile device of the one or more mobile devices, the first user location associated with a first user of the one or more users; and
receiving a second user location of a second mobile device of the one or more mobile devices, the second user location associated with a second user of the one or more users; and
wherein the processing circuit of the building alarm management system is configured to:
compare the first user location to the location information for the building equipment;
compare the second user location to the location information for the building equipment; and
determine that the first user is located closer to the building equipment than the second user.

17. The system of claim 1, wherein sending the one or more alarms to the one or more mobile devices comprises:
sending a first alarm of the one or more alarms to the first user after determining that the first user is located closer to the building equipment than the second user;
sending a second alarm of the one or more alarms to the second user after determining that the first user is located closer to the building equipment than the second user; and
wherein the second alarm is different from the first alarm.

18. The system of claim 1, wherein the stored location information further comprises a plurality of time parameters, each of the plurality of time parameters associated with the one of the one or more mobile devices and one of the plurality of locations.

19. The system of claim 1, wherein the processing circuit of the building alarm management system is configured to:
determine a location that the one of the one or more mobile devices is located in the building; and
send instructions to the one of the one or more mobile devices, the instructions comprising directions for traversing the building from the location that the one of the one or more mobile devices is located in the building to a target location, the target location being different from the future location.

20. The system of claim 1, wherein the processing circuit of the building alarm management system is configured to:
determine a location that the one of the one or more mobile devices is located in the building; and
provide a map to the one of the one or more mobile devices, the map indicating the location that the one of the one or more mobile devices is located in the building and the future location.

* * * * *